(12) United States Patent
Pelur Sukumar et al.

(10) Patent No.: US 12,088,372 B2
(45) Date of Patent: Sep. 10, 2024

(54) DEMODULATION AND CSF FOR 8RX ANTENNAS

(71) Applicant: QUALCOMM Incorporated, San Diego, CA (US)

(72) Inventors: Chitaranjan Pelur Sukumar, San Jose, CA (US); Ahmed Omar Desouky Ali, Santa Clara, CA (US); Yuanning Yu, Santa Clara, CA (US); Qiang Shen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 17/930,894

(22) Filed: Sep. 9, 2022

(65) Prior Publication Data

US 2024/0088956 A1 Mar. 14, 2024

(51) Int. Cl.
*H04B 7/0456* (2017.01)
*H04B 17/327* (2015.01)

(52) U.S. Cl.
CPC ......... *H04B 7/0469* (2013.01); *H04B 7/0482* (2013.01); *H04B 17/327* (2015.01)

(58) Field of Classification Search
CPC ... H04L 5/0048; H04L 5/0023; H04L 1/0026; H04L 5/0057; H04L 5/0053; H04L 5/0051; H04L 25/03343; H04L 5/005; H04B 7/0456; H04B 7/0639; H04B 7/0617; H04B 7/0486; H04B 7/0626; H04B 7/0417; H04B 7/0478; H04B 7/0469; H04W 24/10; H04W 72/0446; H04W 72/23; H04W 52/42; H04W 88/08; H04W 72/21; H04W 52/16; H04W 52/325
USPC ......................................................... 375/262
See application file for complete search history.

(56) References Cited

U.S. PATENT DOCUMENTS

| | | | |
|---|---|---|---|
| 2014/0064393 A1* | 3/2014 | Sun ....................... | H04B 7/0456 375/267 |
| 2019/0089429 A1* | 3/2019 | Wei ....................... | H04B 7/0632 |
| 2021/0297133 A1* | 9/2021 | Cheraghi ............... | H04B 7/066 |
| 2023/0345445 A1* | 10/2023 | Bai ....................... | H04L 5/0098 |

* cited by examiner

Primary Examiner — Eva Y Puente
(74) Attorney, Agent, or Firm — Procopio, Cory, Hargreaves & Savitch LLP

(57) ABSTRACT

A method for wireless communication at a wireless device is disclosed herein. The method includes selecting a wideband precoder for a first set of antennas and a second set of antennas based on at least one matrix, where a number of the first set of antennas and the second set of antennas is greater than a maximum number of supported layers. The method includes calculating, based on the selected wideband precoder, a first set of performance metrics for the first set of antennas and a second set of performance metrics for the second set of antennas. The method includes combining the first set of performance metrics for the first set of antennas and the second set of performance metrics for the second set of antennas based on the calculation.

29 Claims, 13 Drawing Sheets

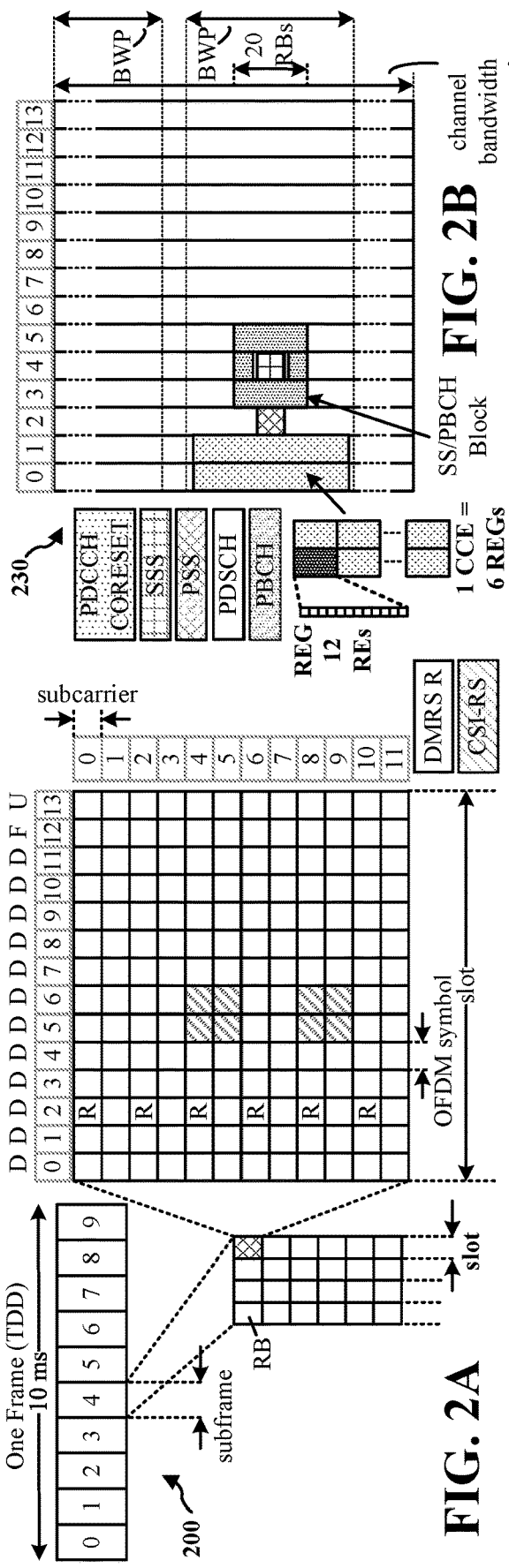
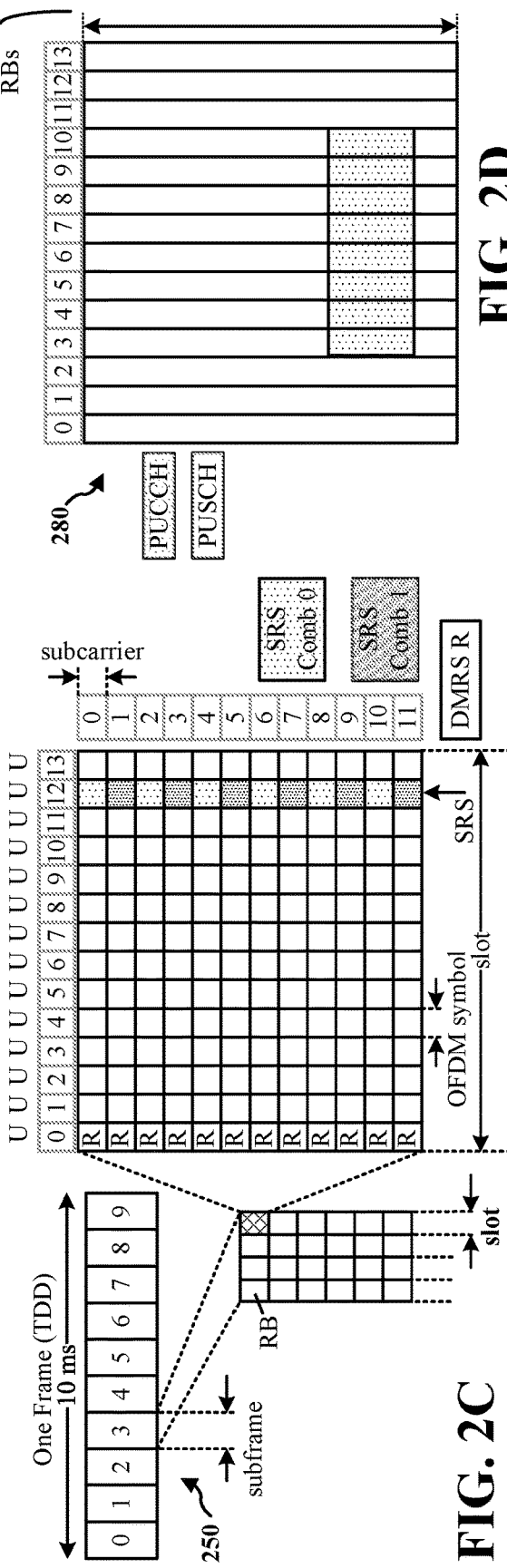
FIG. 2A
FIG. 2B
FIG. 2C
FIG. 2D

DEMODULATION AND CSF FOR 8RX ANTENNAS

TECHNICAL FIELD

The present disclosure relates generally to communication systems, and more particularly, to reception (Rx) antennas.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a wireless device are provided. The apparatus includes a memory and at least one processor coupled to the memory and, based at least in part on information stored in the memory, the at least one processor is configured to: select a wideband precoder for a first set of antennas and a second set of antennas based on at least one matrix, where a number of the first set of antennas and the second set of antennas is greater than a maximum number of supported layers; calculate, based on the selected wideband precoder, a first set of performance metrics for the first set of antennas and a second set of performance metrics for the second set of antennas; and combine the first set of performance metrics for the first set of antennas and the second set of performance metrics for the second set of antennas based on the calculation.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

DETAILED DESCRIPTION

Figure 1:
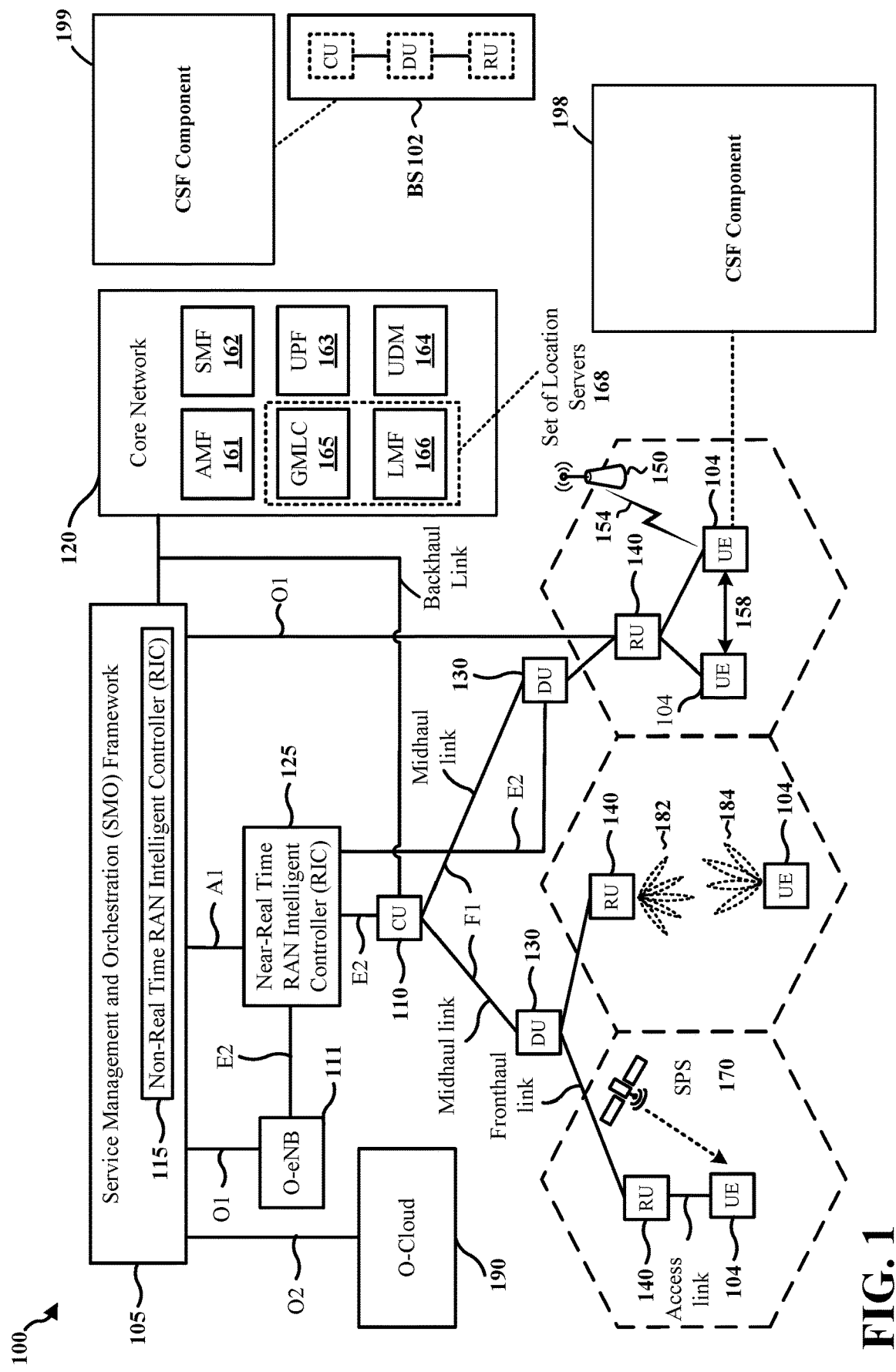
FIG. 1 is a diagram illustrating an example of a wireless communications system and an access network.

A modem used in a wireless communication system may be configured with one or more Rx antennas. The modem may receive a signal via the Rx antenna(s) and demodulate the signal to obtain digital information. Some modems may be configured with a first number of Rx antennas while including baseband resources for a second number of Rx antennas, where the first number is greater than the second number. In an example, a modem may include eight Rx antennas while including baseband resources for four Rx antennas. The modem may have a maximum supported rank equal to the second number of Rx antennas. Various techniques described herein relate to utilizing hardware resources of a modem to perform demodulation and channel state feedback (CSF), where the modem may be configured with a first number of Rx antennas (e.g., eight) and the hardware resources may support a second number of Rx antennas (e.g., four), where the first number is greater than the second number. In an example, a wireless device selects a wideband precoder for a first set of antennas and a second set of antennas based on at least one matrix, where a number of the first set of antennas and the second set of antennas is greater than a maximum number of supported layers. The wireless device calculates, based on the selected wideband precoder, a first set of performance metrics for the first set of antennas and a second set of performance metrics for the second set of antennas. The wireless device combines the first set of performance metrics for the first set of antennas and the second set of performance metrics for the second set of antennas based on the calculation. Vis-à-vis the aforementioned combining, the wireless device may perform 8Rx demodulation and CSF when the wireless device includes baseband resources that support 4Rx demodulation, but not 8Rx demodulation. Thus, the combining may extend functionality of existing hardware resources of the wireless device.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS (e.g., a gNB), 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured with a channel state feedback (CSF) component 198 that is configured to select a wideband precoder for a first set of antennas and a second set of antennas based on at least one matrix, where a number of the first set of antennas and the second set of antennas is greater than a maximum number of supported layers; calculate, based on the selected wideband precoder, a first set of performance metrics for the first set of antennas and a second set of performance metrics for the second set of antennas; and combine the first set of performance metrics for the first set of antennas and the second set of performance metrics for the second set of antennas based on the calculation. In certain aspects, the base station 102 may be configured with a CSF component 199 that is configured to select a wideband precoder for a first set of antennas and a second set of antennas based on at least one matrix, where a number of the first set of antennas and the second set of antennas is greater than a maximum number of supported layers; calculate, based on the selected wideband precoder, a first set of performance metrics for the first set of antennas and a second set of performance metrics for the second set of antennas; and combine the first set of performance metrics for the first set of antennas and the second set of performance metrics for the second set of antennas based on the calculation. Although the following description may be focused on 8Rx antennas, the concepts described herein may be applicable to other amounts of Rx antennas as well. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
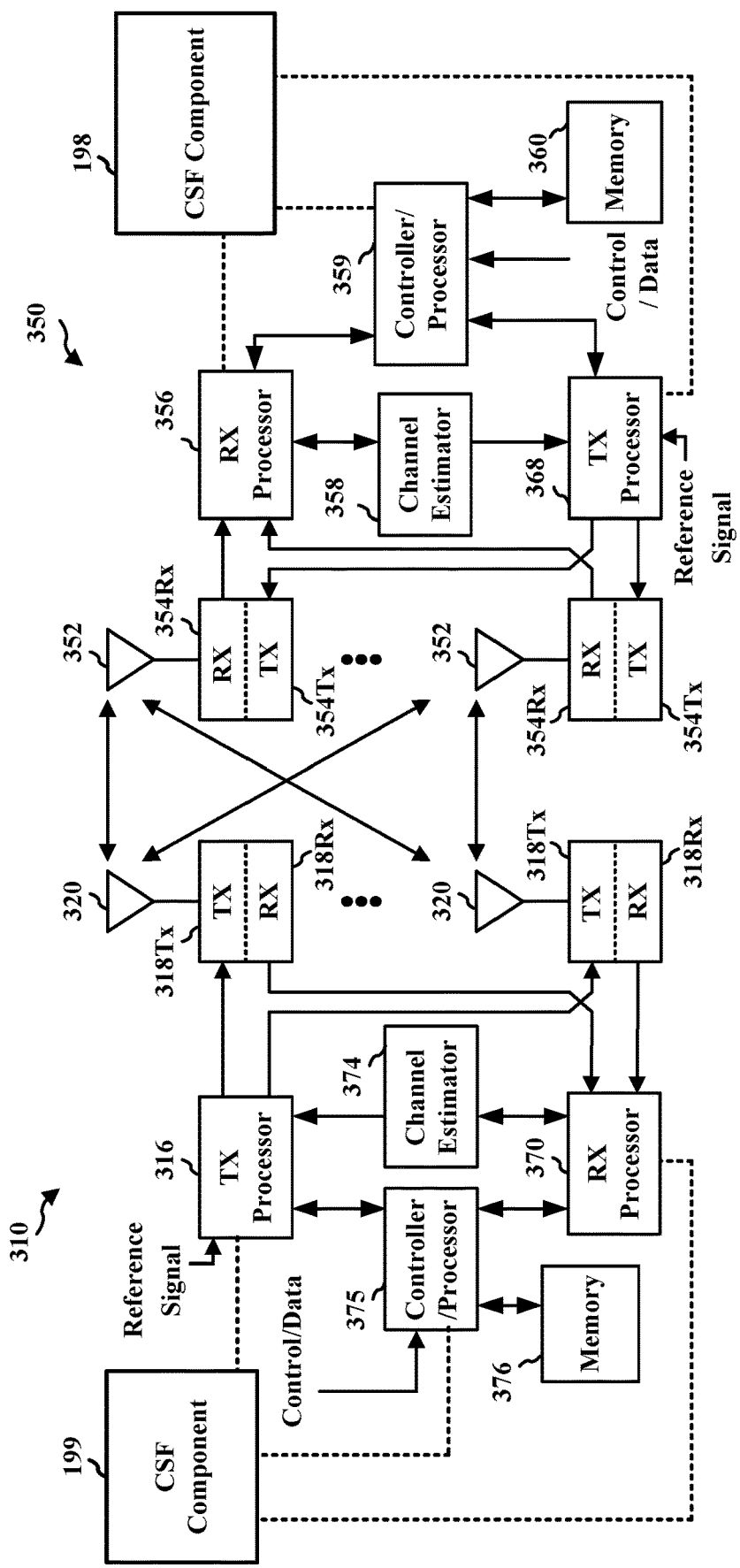
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TB s), demultiplexing of MAC SDUs from TB s, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the CSF component 198 of FIG. 1.

At least one of the TX processor 316, the RX processor 370, and the controller/processor 375 may be configured to perform aspects in connection with the CSF component 199 of FIG. 1.

A modem used in a wireless communication system may be configured with one or more Rx antennas. The modem may receive a signal via the Rx antenna(s) and demodulate the signal to obtain digital information. Some modems may be configured with a first number of Rx antennas while including baseband resources for a second number of Rx antennas, where the first number is greater than the second number. In an example, a modem may include eight Rx antennas while including baseband resources for four Rx antennas. The modem may have a maximum supported rank equal to the second number of Rx antennas. Thus, additional antennas in excess of the second number of Rx antennas may provide receive diversity for the modem, that is, the additional antennas may receive the same information to mitigate fading. The additional antennas may not increase a number of layers that may be decoded by the modem. The modem may handle a complexity increase associated with the additional antennas by halving bandwidth supported across component carriers supported in baseline.

Various techniques described herein relate to utilizing hardware resources of a modem to perform demodulation and channel state feedback (CSF), where the modem may be configured with a first number of Rx antennas (e.g., eight) and the hardware resources may support a second number of Rx antennas (e.g., four), where the first number is greater than the second number. In an example, a wireless device selects a wideband precoder for a first set of antennas and a second set of antennas based on at least one matrix, where a number of the first set of antennas and the second set of antennas is greater than a maximum number of supported layers. The wireless device calculates, based on the selected wideband precoder, a first set of performance metrics for the first set of antennas and a second set of performance metrics for the second set of antennas. The wireless device combines the first set of performance metrics for the first set of antennas and the second set of performance metrics for the second set of antennas based on the calculation. Vis-à-vis the aforementioned combining, the wireless device may perform 8Rx demodulation and CSF when the wireless device includes baseband resources that support 4Rx demodulation, but not 8Rx demodulation. Thus, the combining may extend functionality of existing hardware resources of the wireless device.

As used herein, the term "spectral efficiency" (SPEF) may refer to a number of bits per second of data that can be supported by each hertz of bandwidth. Spectral efficiency may be measured in bps/Hz. As used herein, the term "signal-to-noise ratio" (SNR) may refer to a ratio of power in a signal to power contained in noise that is present at a particular point in a transmission. SNR may be measured in decibels. As used herein, the terms "rank" or "layer(s)" may refer to a number of simultaneously transmitted data streams that can be decoded by a receiver. As used herein, the term "precoding matrix indicator" (PMI) may refer to an indication of a precoder matrix given a selected rank. As used herein, the term "wideband precoder" may refer to a transformation that is uniformly applied at a transmitter across an entire bandwidth. As used herein, the term "performance metrics" may refer to measurements that may be used for CSF purposes. As used herein, the term "whitened channel" may refer to a channel matrix that has been normalized by a covariance matrix (e.g., a noise covariance matrix). As used herein, the term "log likelihood ratio" (LLR) may refer to a measure of a measure of confidence of a transmitted bit being a zero or a one.

Figure 4:
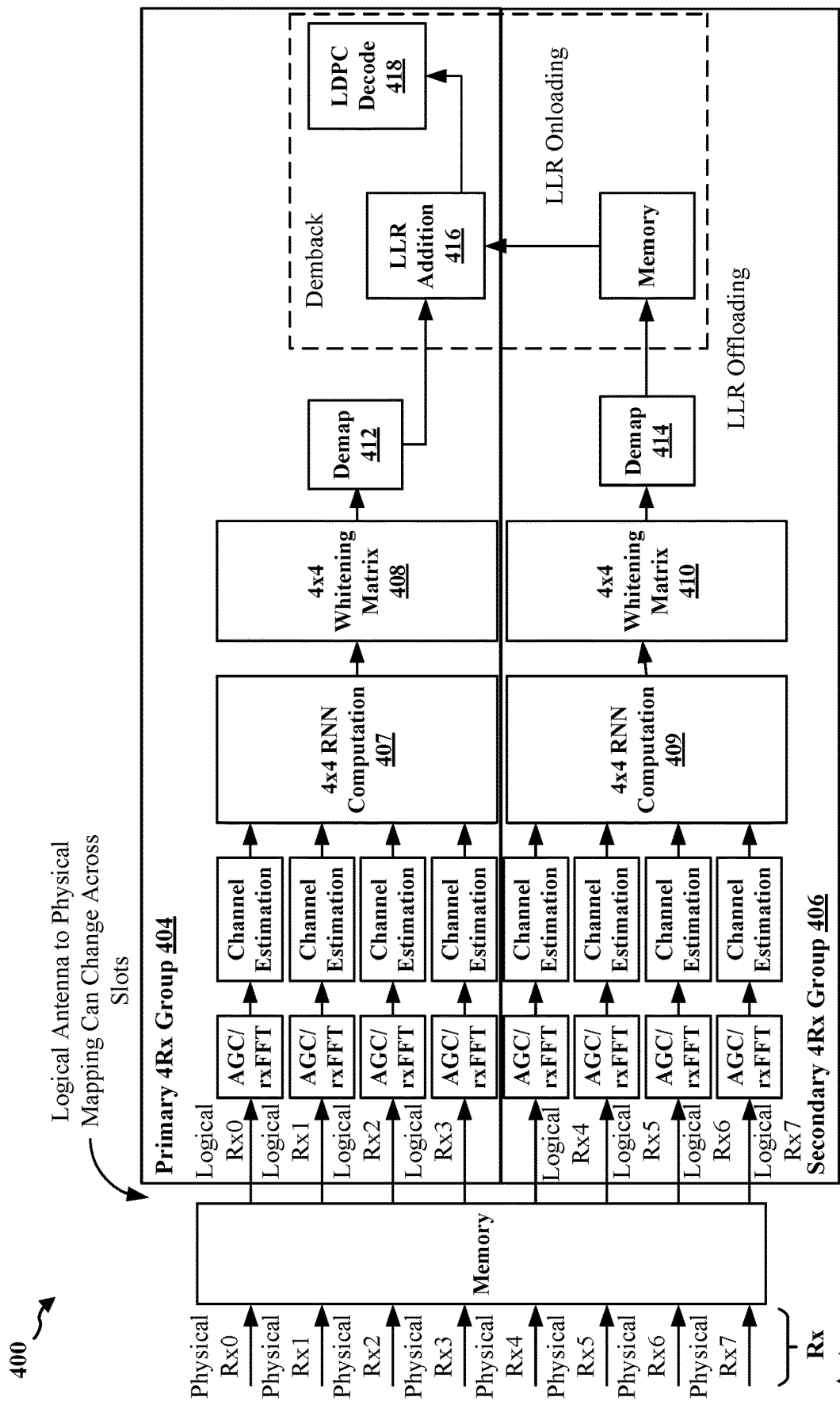
FIG. 4 is a diagram illustrating an example demodulation flow for a physical downlink shared channel (PDSCH).

FIG. 4 is a diagram 400 illustrating an example demodulation flow for a PDSCH. The demodulation flow may be performed by a wireless device, such as a UE (e.g., the UE 104, the UE 350, the UE 902, the apparatus 1204, etc.). More specifically, the demodulation flow may be performed by the cellular baseband processor 1224. The demodulation flow may be performed by a modem that includes 8Rx antennas, but that does not support 8Rx whitening and demapping.

As illustrated in the diagram 400, a set of Rx antennas 402 may be divided into a primary 4Rx group 404 and a secondary 4Rx group 406. Stated differently, the set of Rx antennas 402 may be divided into two 4Rx carriers. In an example, the set of Rx antennas 402 includes eight antennas, the primary 4Rx group 404 includes four antennas, and the secondary 4Rx group 406 includes four antennas. In one aspect, the set of 4Rx antennas in each carrier across slots may be different.

Each physical Rx antenna (e.g., physical Rx0, physical Rx1, physical Rx2, physical Rx3) in the primary 4Rx group 404 may be mapped to a logical Rx antenna (e.g., logical Rx0, logical Rx1, logical Rx2, logical Rx3) and each physical Rx antenna (e.g., physical Rx4, physical Rx5, physical Rx6, physical Rx7) in the secondary 4Rx group 406 may be mapped to a logical Rx antenna (e.g., logical Rx4, logical Rx5, logical Rx6, logical Rx7, respectively). Logical Rx antenna to physical Rx antenna mappings may change across slots.

In an example, eight signals may be received at the set of Rx antennas 402 over various channels (e.g., eight channels). Each of the eight signals may have information modulated thereon. For instance, four signals may be received at Rx antennas of the primary 4Rx group 404 and four signals may be received at Rx antennas of the secondary 4Rx group 406. Based upon mapping of the physical Rx antennas to the logical Rx antennas, the wireless device may perform automatic gain control (AGC) and a Fast Fourier Transform (rxFFT) on each of the eight signals.

The wireless device may perform channel estimation on each respective channels associated with each of the eight signals based upon reference signals included in the signals. In an example, channel estimation for channels associated with the primary 4Rx group 404 may be aided by a 4×4 recurrent neural network (RNN) computation 407 and channel estimation for channels associated with the secondary 4Rx group 406 may be aided by a 4×4 RNN computation 409. The input to the 4×4 RNN computation 407 and the 4×4 RNN computation 409 may be OFDM symbols associated with signals associated with the primary 4Rx group 404 and the secondary 4Rx group 406, respectively.

The wireless device may provide an output of the 4×4 RNN computation 407 as input to a 4×4 whitening matrix 408. The output of the 4×4 RNN computation 407 may be channel estimates for each channel associated with the primary 4Rx group 404. The 4×4 whitening matrix 408 may output a first whitened channel. The first whitened channel may be associated with a first carrier associated with the primary 4Rx group 404. The wireless device may perform a demap 412 on the first whitened channel/first carrier to obtain a first set of log likelihood ratios (LLRs).

The wireless device may provide an output of the 4×4 RNN computation 409 as input to a 4×4 whitening matrix 410. The output of the 4×4 RNN computation 409 may be channel estimates for each channel associated with the secondary 4Rx group 406. The 4×4 whitening matrix 410 may output a second whitened channel. The second whitened channel may be associated with a second carrier associated with the secondary 4Rx group 406. The wireless device may perform a demap 414 on the second whitened channel/second carrier to obtain a first set of LLRs.

Via LLR offloading and onloading, the wireless device may perform LLR addition 416 across the first set of LLRs and the second set of LLRs, that is the wireless device may add the first set of LLRs and the second set of LLRs. LLR offloading may refer to how LLRs are transferred from a hardware block that performed decoding to memory. LLR onloading may refer to how LLRs are transferred from the memory to the hardware block. The wireless device may perform a low-density parity check (LDPC) decode 418 on the sum. Subsequent to performing the LDPC decode 418, the wireless device may obtain the information that was modulated onto the eight signals.

Although the demodulation flow is described above as being performed by a UE for a PDSCH, the demodulation flow may also be performed by a network entity (e.g., the base station 102, the RU 140, the base station 310, the base station 904, the network entity 1302, etc.) for demodulating a PUSCH. Additionally, the set of Rx antennas 402 (i.e., the primary 4Rx group 404 and the secondary 4Rx group 406) may belong to the network entity.

Figure 5:
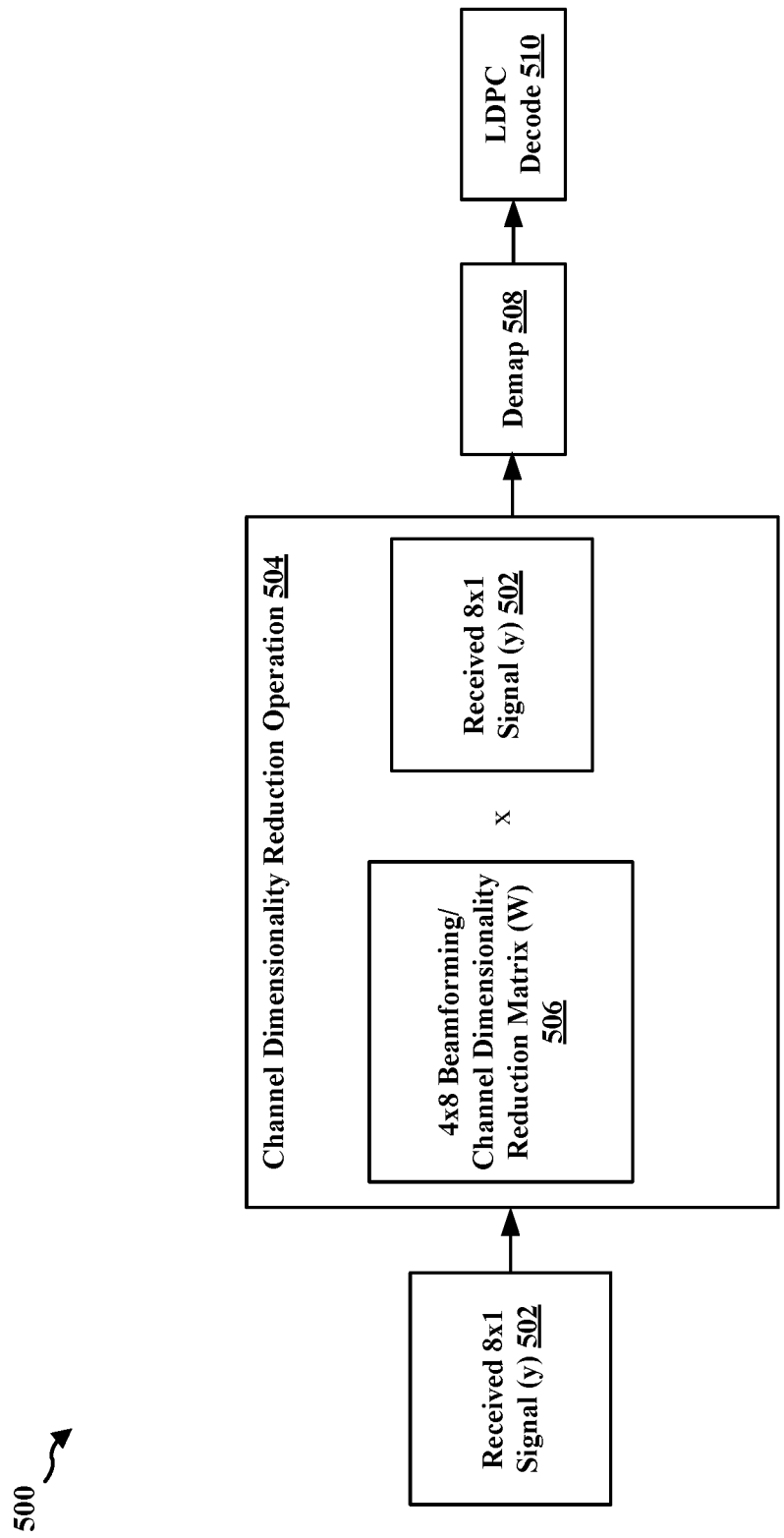
FIG. 5 is a diagram illustrating an example demodulation flow.

FIG. 5 is a diagram 500 illustrating an example demodulation flow. The demodulation flow may be performed by a wireless device. The wireless device may be a UE (e.g., the UE 104, the UE 350, the UE 902, the apparatus 1204, etc.) or a network entity (e.g., the base station 102, the RU 140, the base station 310, the base station 904, the network entity 1302, etc.).

The wireless device may receive an 8×1 signal (y) 502 that information modulated thereon. The wireless device may perform a channel dimensionality reduction operation 504. The channel dimensionality reduction operation 504 may reduce a set of 8Rx antennas to a set of 4Rx antennas. The channel dimensionality reduction operation 504 may include multiplying a 4×8 beamforming/channel dimensionality reduction matrix (W) 506 by the received 8×1 signal 502 to obtain 4×1 matrix. The 4×8 beamforming/channel dimensionality reduction matrix 506 may be calculated based on a least minimum mean squared error (LMMSE) framework.

The wireless device may demap 508 the output of the channel dimensionality reduction operation 504 to obtain LLRs. The wireless device may perform a LDPC decode 510 on the LLRs. Subsequent to performing the LDPC decode 510, the wireless device may obtain the information that was modulated onto the received 8×1 signal 502.

Figure 6:
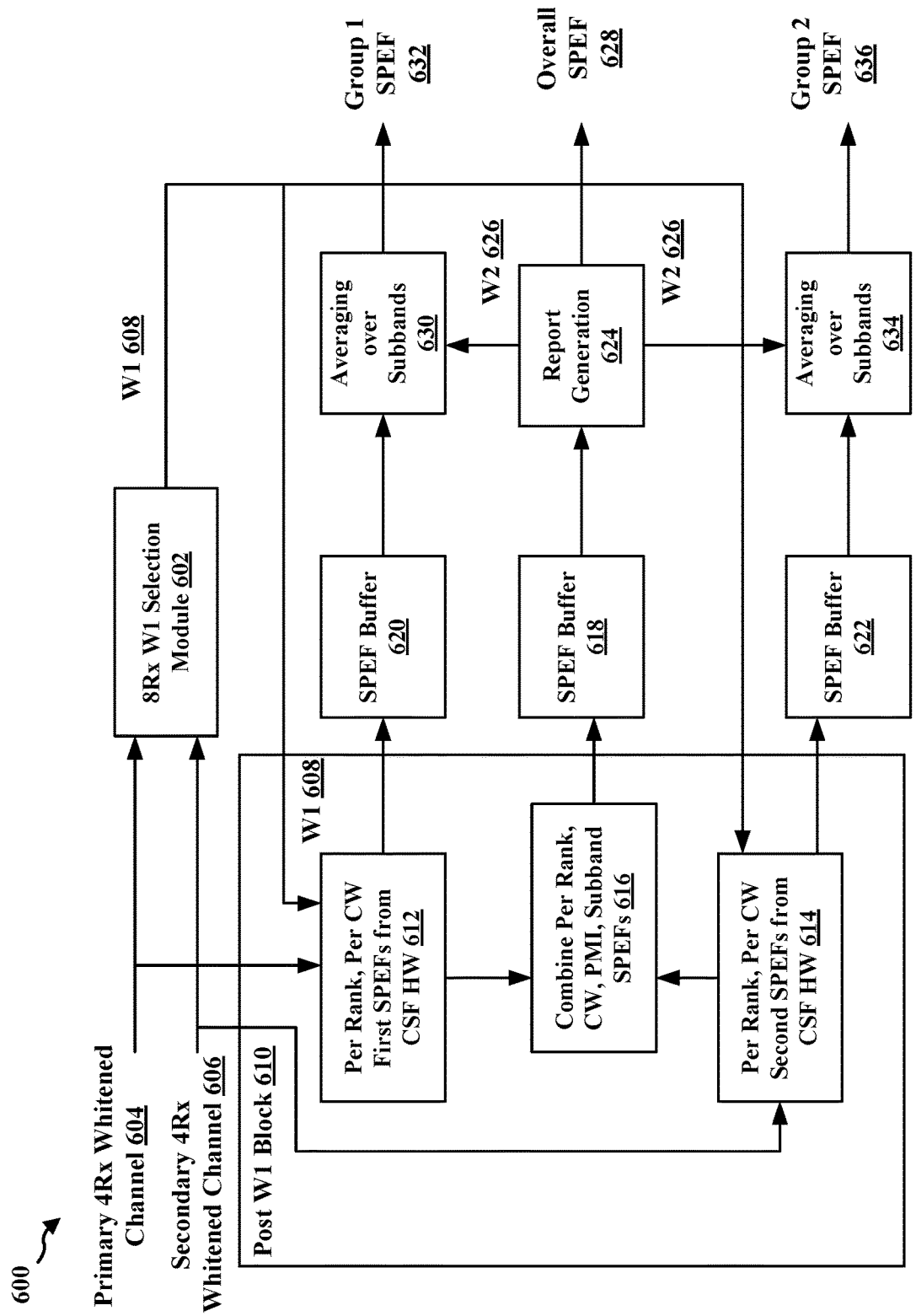
FIG. 6 is a diagram illustrating an example of a process for generating a spectral efficiency for a first set of antennas and a second set of antennas.

FIG. 6 is a diagram 600 illustrating an example of a process for generating a spectral efficiency for a first set of antennas and a second set of antennas. In an example, the first set of antennas may be the primary 4Rx group 404 and the second set of antennas may be the secondary 4Rx group 406 described above in the description of the diagram 400. The process may be performed by a UE (e.g., the UE 104, the UE 350, the UE 902, the apparatus 1204, etc.). The process may also be performed by a network entity (e.g., the base station 102, the RU 140, the base station 310, the base station 904, the network entity 1302, etc.).

An 8Rx W1 selection module 602 may receive a primary 4Rx whitened channel 604 and a secondary 4Rx whitened channel 606. The primary 4Rx whitened channel 604 and the secondary 4Rx whitened channel 606 may correspond to an output of the 4×4 whitening matrix 408 and the 4×4 whitening matrix 410, respectively. In general, the 8Rx W1 selection module 602 may be configured to select a wideband precoder (W1) based on a covariance matrix (described in greater detail below), the primary 4Rx whitened channel 604, and the secondary 4Rx whitened channel 606.

The wideband precoder 608 may capture long-term frequency-independent characteristics of one or more channels (e.g., the primary 4Rx whitened channel 604 and the secondary 4Rx whitened channel 606). The wideband precoder 608 may be a matrix that defines a set of beams pointing in different directions, where each column of the matrix may define a beam. Selecting the wideband precoder may include selecting a limited set of beam direction from a large set of possible beam directions defined by a full set of wideband precoders within a codebook.

A post W1 block 610 may receive the primary 4Rx whitened channel 604, the secondary 4Rx whitened channel 606, and the wideband precoder 608. At 612, the post W1 block 610 may calculate first SPEFs for the primary 4Rx whitened channel 604 on a per rank, per codeword (CW) basis from channel state feedback (CSF) hardware (HW). At 614, the post W1 block 610 may calculate second SPEFs for the secondary 4Rx whitened channel 606 on a per rank, per CW basis from the CSF HW. At 616, the post W1 block 610 may combine the first SPEFs and the second SPEFs on a per rank, per CW, per subband, and per precoding matrix indicator (PMI) basis.

At 618, the combined first SPEFs and second SPEFs may undergo SPEF buffering. SPEF buffering may refer to placing SPEF results from hardware and SPEF results after combining into buffers. At 620, the first SPEFs may undergo SPEF buffering. At 622, the second SPEFs may undergo SPEF buffering. At 624, a report may be generated based upon the buffered and combined first SPEF and second SPEF. The report may indicate an overall SPEF 628 for the combination of the primary 4Rx whitened channel 604 and the secondary 4Rx whitened channel 606. The report may indicate a narrowband precoder (W2) 626. The narrowband precoder 626 may capture short-term and/or frequency dependent characteristics of a channel (e.g., the primary 4Rx whitened channel 604 and the secondary 4Rx whitened channel 606). The narrowband precoder 626 may be a matrix.

At 630, the buffered first SPEFs may undergo averaging over subbands based on the narrowband precoder 626 to generate a group 1 SPEF 632, that is, a SPEF corresponding to the primary 4Rx group 404. At 634, the second buffered SPEFs may undergo averaging over subbands based on the narrowband precoder 626 to generate a group 2 SPEF 636, that is, a SPEF corresponding to the secondary 4Rx group 406.

Figure 7:
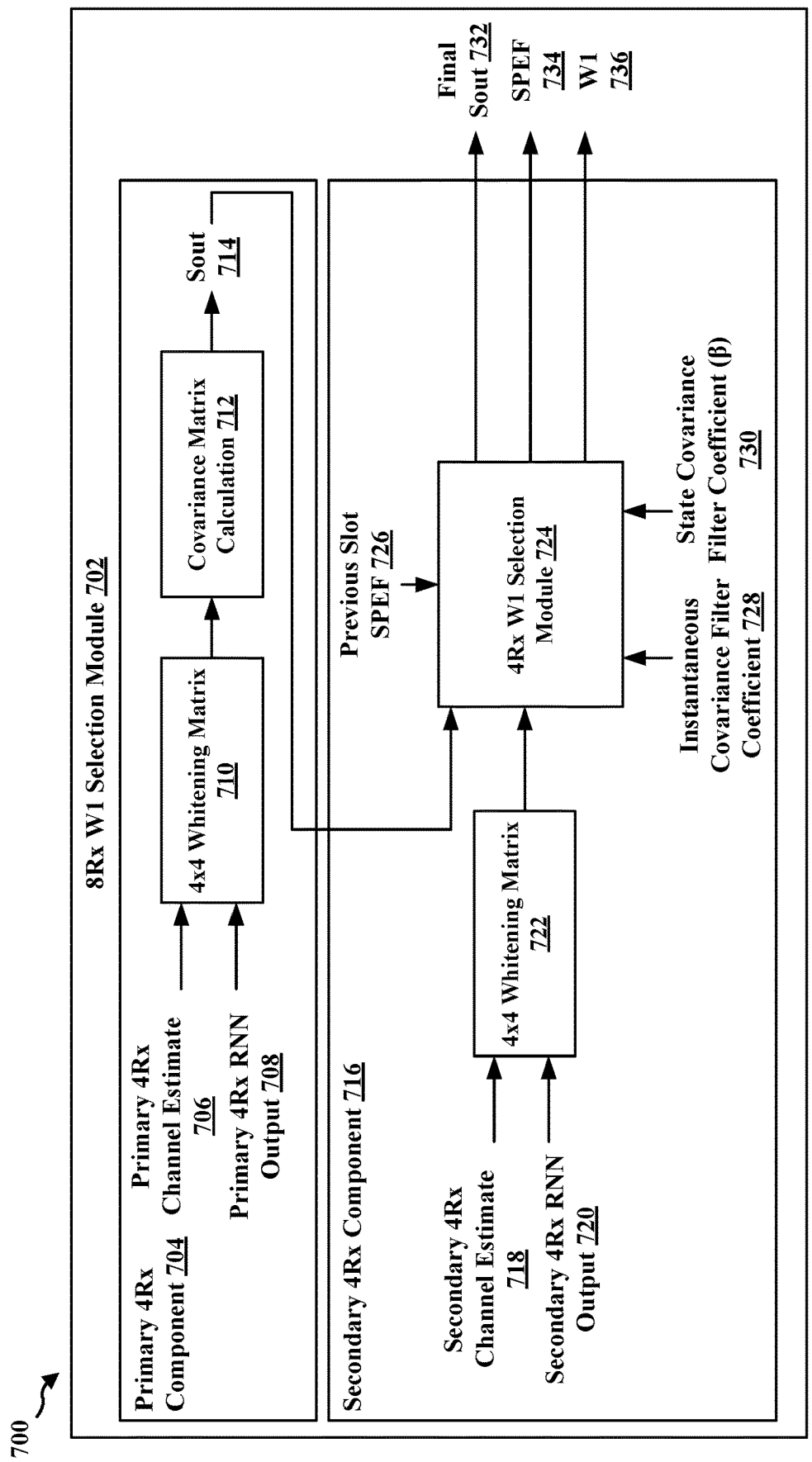
FIG. 7 is a diagram illustrating an example 8Rx W1 selection module.

FIG. 7 is a diagram 700 illustrating an example 8Rx W1 selection module 702. The 8Rx W1 selection module 702 may be or include the 8Rx W1 selection module 602 described above. The 8Rx W1 selection module 702 may be included in hardware and/or software of a wireless device. The wireless device may be a UE (e.g., the UE 104, the UE 350, the UE 902, the apparatus 1204, etc.) or a network entity (e.g., the base station 102, the RU 140, the base station 310, the base station 904, the network entity 1302, etc.). The 8Rx W1 selection module 702 may include a primary 4Rx component 704. The primary 4Rx component 704 may include a 4×4 whitening matrix 710. The 4×4 whitening matrix 710 may be or include the 4×4 whitening matrix 408 described above. The 4×4 whitening matrix 710 may receive a primary 4Rx channel estimate 706 and a primary 4Rx RNN output 708 as input. The primary 4Rx RNN output 708 may be the output of the 4×4 RNN computation 407 described above. The primary 4Rx component 704 may generate a whitened channel based upon the 4×4 whitening matrix 710, the primary 4Rx channel estimate 706, and the primary 4Rx RNN output 708. The primary 4Rx component 704 may perform a covariance matrix calculation 712. The covariance matrix calculation 712 may be based on the whitened channel and a covariance matrix. The covariance matrix may be averaged across all of a set of 8Rx antennas (e.g., all of the set of Rx antennas 402). For instance, the covariance matrix calculation 712 may include calculating a first covariance matrix for the 4×4 whitening matrix 408 of the primary 4Rx group 404 and calculating a second covariance matrix for the 4×4 whitening matrix 410 of the secondary 4Rx group 406. The covariance matrix calculation 712 may further include averaging the first covariance matrix and the second covariance matrix to obtain a single covariance matrix. The covariance matrix calculation 712 may generate an output (Sout 714). Sout 714 may be a SPEF measurement.

The 8Rx W1 selection module 702 may include a secondary 4Rx component 716. The secondary 4Rx component 716 may include a 4×4 whitening matrix 722. The 4×4 whitening matrix 722 may be or include the 4×4 whitening matrix 410 described above. The 4×4 whitening matrix 722 may receive a secondary 4Rx channel estimate 718 and a secondary 4Rx RNN output 720 as input. The secondary 4Rx RNN output 720 may be the output of the 4×4 RNN computation 409 described above. The secondary 4Rx component 704 may generate a whitened channel based upon the 4×4 whitening matrix 722, the secondary 4Rx channel estimate 718, and the secondary 4Rx RNN output 720.

The 8Rx W1 selection module 702 may include a 4Rx W1 selection module 724. The 4Rx W1 selection module 724 may receive, as input, the whitened channel, Sout 714, a previous slot SPEF 726, an instantaneous covariance filter coefficient 728, and a state covariance filter coefficient ((3) 730. In an example, the instantaneous covariance filter coefficient 728 and the state covariance filter coefficient ((3) may each be equal to 0.5. Based upon the input, the 4Rx W1 selection module 724 may output a final Sout 732 and a SPEF 734. Furthermore, based on the input, the 4Rx W1 selection module 724 may select a wideband precoder (W1) 736. The wideband precoder 736 may be or include the wideband precoder 608 described above.

Figure 8:
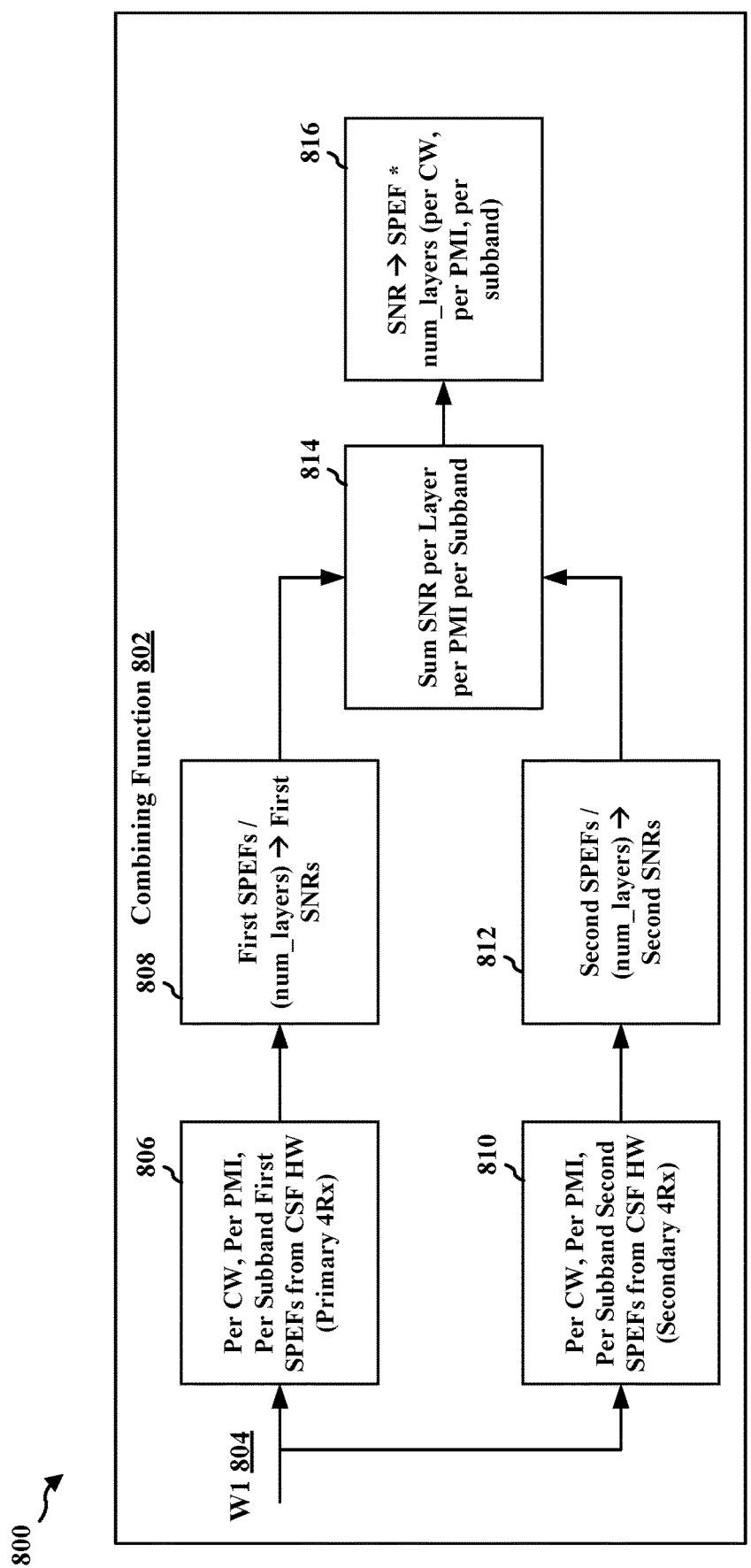
FIG. 8 is a diagram illustrating an example combining function.

FIG. 8 is a diagram 800 illustrating an example combining function 802. The combining function 802 may be implemented in hardware and/or software at a wireless device. The wireless device may be a UE (e.g., the UE 104, the UE 350, the UE 902, the apparatus 1204, etc.) or a network entity (e.g., the base station 102, the RU 140, the base station 310, the base station 904, the network entity 1302, etc.).

At 806, the combining function 802 may compute, per CW, per PMI, and per subband, first SPEFs based on a wideband precoder (W1) 804. The first SPEFs may be for the primary 4Rx group 404 described above. The wideband precoder 804 may be or include the wideband precoder 608 or the wideband precoder 736. At 808, the combining function 802 may convert the first SPEFs to first SNRs by taking a quotient of the first SPEFs and a number of supported layers ("num_layers"). In an example, the number of supported layers may be four.

At 810, the combining function 802 may compute, per CW, per PMI, and per subband, second SPEFs based on the wideband precoder 804. The second SPEFs may be for the secondary 4Rx group 406 described above. At 812, the combining function 802 may convert the second SPEFs to second SNRs by taking a quotient of the second SPEFs and the number of supported layers. In an example, the number of supported layers is four.

At 814, the combining function 802 computes a sum of the first SNRs and the second SNRs (per layer, per PMI, and per subband). At 816, the combining function 802 converts the sum into an overall SPEF for the combination of the primary 4Rx group 404 and the secondary 4Rx group 406 by multiplying the sum (i.e., the SNR) by the number of supported layers (e.g., four). The overall SPEF may be used for CSF purposes. For example, the overall SPEF may be used by a network to determine parameters of wireless transmission such as rank, precoding, modulation, and coding rate.

Figure 9:
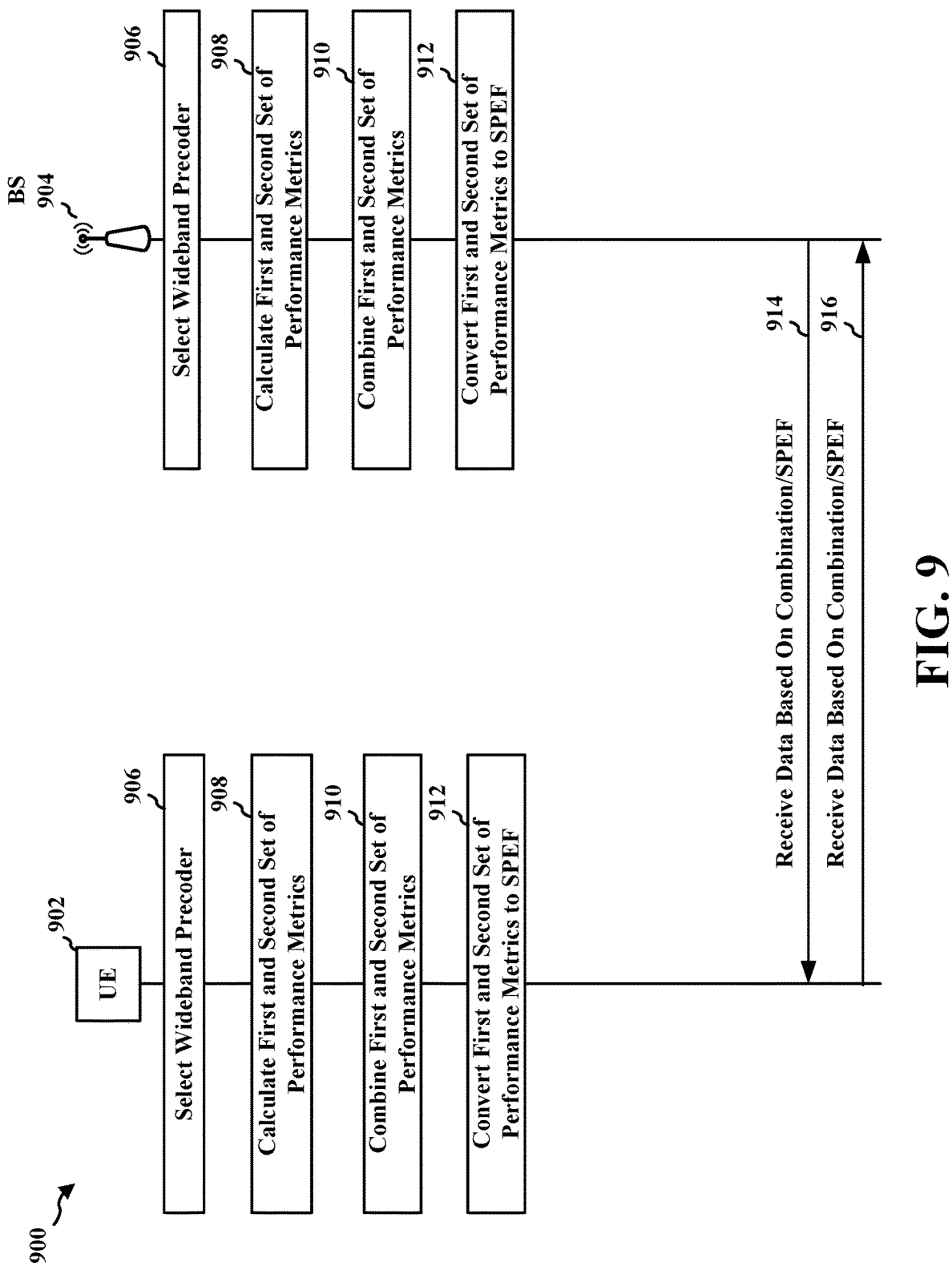
FIG. 9 is a diagram illustrating example communications between a UE and a base station.

FIG. 9 is a diagram 900 illustrating an example communications flow between a UE 902 and a base station 904. At 906, the UE 902 or the base station 904 may select a wideband precoder for a first set of antennas and a second set of antennas based on at least one matrix. In an example, the wideband precoder may be selected by the 8Rx W1 selection module 602 or the 8Rx W1 selection module 702. In an example, the wideband precoder may be the wideband precoder 608, the wideband precoder 736, or the wideband precoder 804. In an example, the first set of antennas may be the primary 4Rx group 404 and the second set of antennas may be the secondary 4Rx group 406.

At 908, the UE 902 or the base station 904 may calculate a first set of performance metrics for the first set of antennas and a second set of performance metrics for the second set of antennas based on the wideband precoder. In an example, the first set of performance metrics may be the first SPEFs calculated at 612 and the second set of performance metrics may be the second SPEFs calculated at 614. In another example, the first set of performance metrics may be the first SPEFs calculated at 806 and the second set of performance metrics may be the second SPEFs calculated at 810.

At 910, the UE 902 or the base station 904 may combine the first set of performance metrics and the second set of performance metrics into a combined set of performance metrics. In an example, the combined set of performance metrics may correspond to the summed SNRs computed at 814.

At 912, the UE 902 or the base station 904 may convert the combined set of performance metrics to a SPEF for the first set of antennas and the second set of antennas. In an example, the UE 902 or the base station 904 may perform 816 described in the description of the diagram 800 to convert the combined set of performance metrics to the SPEF.

The combined set of performance metrics and/or the SPEF for the first set of antennas and the second set of antennas may be used for CSF purposes. In one aspect, at 914, the UE 902 may receive data or at least one signal from the base station 904 based on the combined set of performance metrics and/or the SPEF for the first set of antennas and the second set of antennas. In one aspect, at 916, the base station 904 may receive data or at least one signal from the UE 902 based on the combined set of performance metrics and/or the SPEF for the first set of antennas and the second set of antennas.

Figure 10:
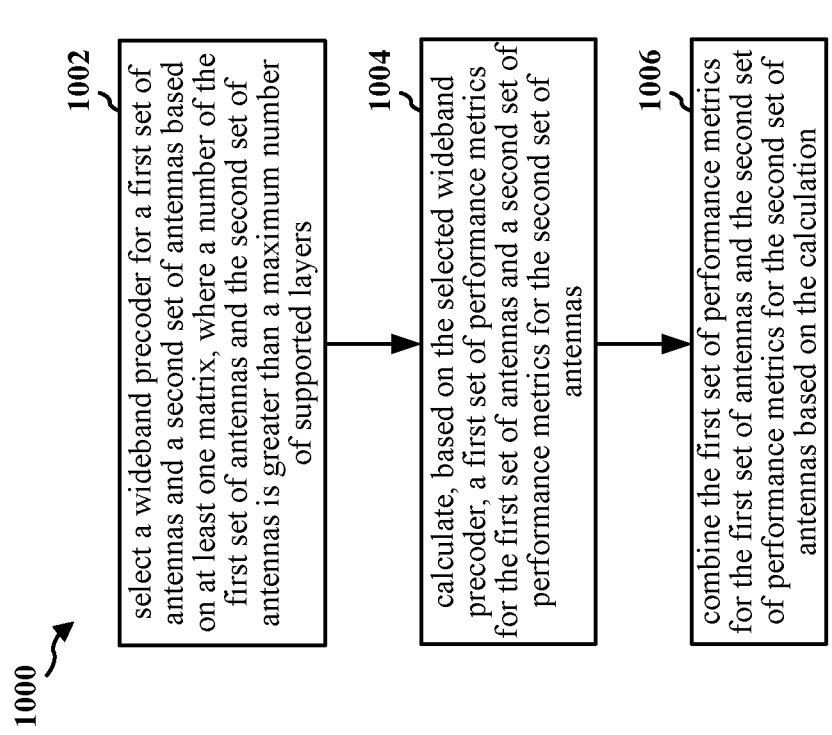
FIG. 10 is a flowchart of a method of wireless communication.

FIG. 10 is a flowchart 1000 of a method of wireless communication. The method may be performed by a wireless device. For instance, the wireless device may be UE (e.g., the UE 104, the UE 350, the apparatus 1204) or a network entity (e.g., the base station 102, the CU 110, the DU 130, the RU 140, the base station 310, the network entity 1202). The method may be associated with various technical advantages at the wireless device, such as enabling the wireless device to perform 8Rx demodulation and CSF when the wireless device includes baseband resources that support 4Rx demodulation, but not 8Rx demodulation. In an example, the method may be performed by the CSF component 198 or the CSF component 199.

At 1002, the wireless device selects a wideband precoder for a first set of antennas and a second set of antennas based on at least one matrix, where a number of the first set of antennas and the second set of antennas is greater than a maximum number of supported layers. For example, FIG. 9 at 906 shows the UE 902 or the base station 904 may select a wideband precoder. In another example, the wideband precoder may be the wideband precoder 608, the wideband precoder 736, or the wideband precoder 804 of FIGS. 6, 7, and 8, respectively. In a further example, the 8Rx W1 selection module 602 or the 8Rx W1 selection module 702 may select the wideband precoder. In yet another example, the first set of antennas may be antennas in the primary 4Rx group 404 and the second set of antennas may be antennas in the secondary 4Rx group 406. In another example, the at least one matrix may be the covariance matrix utilized in the covariance matrix calculation 712. For example, 1002 may be performed by the CSF component 198 or the CSF component 199.

At 1004, the wireless device calculates, based on the selected wideband precoder, a first set of performance metrics for the first set of antennas and a second set of performance metrics for the second set of antennas. For example, FIG. 9 at 908 shows the UE 902 or the base station 904 may calculate a first set of performance metrics and a second set of performance metrics. In another example, the first set of performance metrics may be for antennas in the primary 4Rx group 404 and the second set of performance metrics may be for antennas in the secondary 4Rx group 406. In a further example, FIG. 6 at 612 and 614 shows that a wireless device may calculate first SPEFs and second SPEFs, respectively based on a wideband precoder 608. In another example, FIG. 8 at 806 and 810 shows a wireless device may calculate first SPEFs and second SPEFs, respectively based on a wideband precoder 804. For example, 1004 may be performed by the CSF component 198 or the CSF component 199.

At 1006, the wireless device combines the first set of performance metrics for the first set of antennas and the second set of performance metrics for the second set of antennas based on the calculation. For example, FIG. 9 at 910 shows the UE 902 or the base station 904 may combine a first set of performance metrics and a second set of performance metrics. In another example, FIG. 6 at 616 shows that a wireless device may combine the first SPEFs and the second SPEFs. In yet another example, FIG. 8 at 814 shows that a wireless device may sum first SNRs and second SNRs calculated at 808 and 812, respectively. For example, 1006 may be performed by the CSF component 198 or the CSF component 199.

Figure 11:
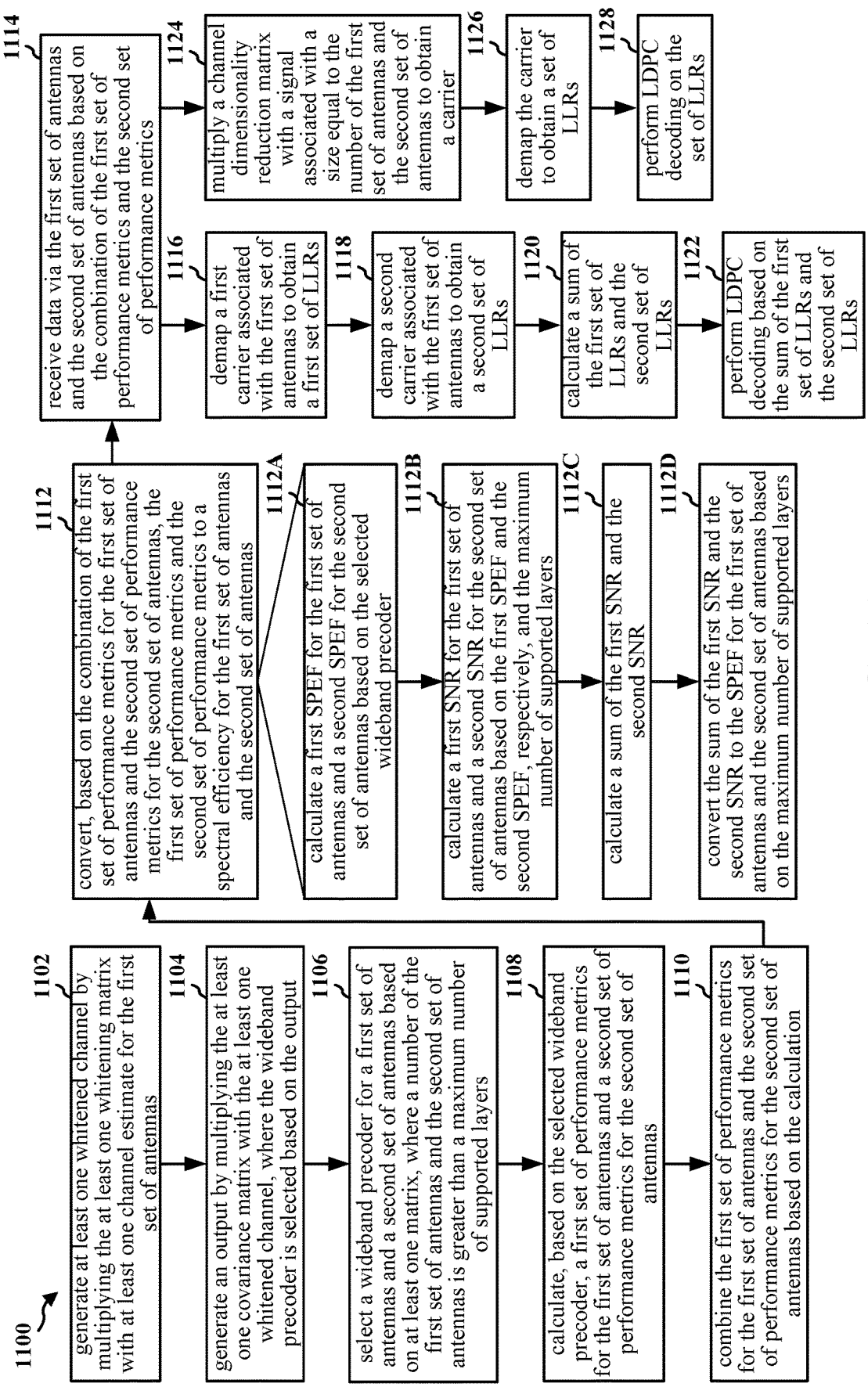
FIG. 11 is a flowchart of a method of wireless communication.

FIG. 11 is a flowchart 1100 of a method of wireless communication. The method may be performed by a wireless device. For instance, the wireless device may be UE (e.g., the UE 104, the UE 350, the apparatus 1204) or a network entity (e.g., the base station 102, the CU 110, the DU 130, the RU 140, the base station 310, the network entity 1202). The method may be associated with various technical advantages at the wireless device, such as enabling the wireless device to perform 8Rx demodulation and CSF when the wireless device includes baseband resources that support 4Rx demodulation, but not 8Rx demodulation. In an example, the method (including the various aspects discussed below) may be performed by the CSF component 198 or the CSF component 199.

At 1106, the wireless device selects a wideband precoder for a first set of antennas and a second set of antennas based on at least one matrix, where a number of the first set of antennas and the second set of antennas is greater than a maximum number of supported layers. For example, FIG. 9 at 906 shows the UE 902 or the base station 904 selecting a wideband precoder. In another example, the wideband precoder may be the wideband precoder 608, the wideband precoder 736, or the wideband precoder 804 of FIGS. 6, 7, and 8, respectively. In a further example, the 8Rx W1 selection module 602 or the 8Rx W1 selection module 702 may select the wideband precoder. In yet another example, the first set of antennas may be antennas in the primary 4Rx group 404 and the second set of antennas may be antennas in the secondary 4Rx group 406. In another example, the at least one matrix may be the covariance matrix utilized in the covariance matrix calculation 712. For example, 1106 may be performed by the CSF component 198 or the CSF component 199.

At 1108, the wireless device calculates, based on the selected wideband precoder, a first set of performance metrics for the first set of antennas and a second set of performance metrics for the second set of antennas. For example, FIG. 9 at 908 shows the UE 902 or the base station 904 may calculate a first set of performance metrics and a second set of performance metrics. In another example, the first set of performance metrics may be for antennas in the primary 4Rx group 404 and the second set of performance metrics may be for antennas in the secondary 4Rx group 406. In a further example, FIG. 6 at 612 and 614 shows that a wireless device may calculate first SPEFs and second SPEFs, respectively based on a wideband precoder 608. In another example, FIG. 8 at 806 and 810 shows a wireless device may calculate first SPEFs and second SPEFs, respectively based on a wideband precoder 804. For example, 1108 may be performed by the CSF component 198 or the CSF component 199.

At 1110, the wireless device combines the first set of performance metrics for the first set of antennas and the second set of performance metrics for the second set of antennas based on the calculation. For example, FIG. 9 at 910 shows the UE 902 or the base station 904 may combine a first set of performance metrics and a second set of performance metrics. In another example, FIG. 6 at 616 shows that a wireless device may combine the first SPEFs and second SPEFs. In yet another example, FIG. 8 at 814 shows that a wireless device may sum first SNRs and second SNRs calculated at 808 and 812, respectively. For example, 1110 may be performed by the CSF component 198 or the CSF component 199.

In one aspect, the at least one matrix may be calculated based on an average of all of the first set of antennas and the second set of antennas. For example, the covariance matrix utilized in the covariance matrix calculation 712 may be calculated based on an average of antennas in the primary 4Rx group 404 and antennas in the secondary 4Rx group 406.

In one aspect, the first set of antennas may include a set of first Rx antennas and the second set of antennas includes a set of second Rx antennas. For example, the set of first Rx antennas may be antennas in the primary 4Rx group 404 and the set of second Rx antennas may be antennas in the secondary 4Rx group 406.

In one aspect, the at least one matrix may include at least one covariance matrix. For example, the at least one matrix may be the covariance matrix utilized in the covariance matrix calculation 712.

In one aspect, the at least one matrix may further include at least one whitening matrix. For example, the at least one matrix may be the 4×4 whitening matrix 408 and/or the 4×4 whitening matrix 410. In another example, the at least one whitening matrix may be the 4×4 whitening matrix 710 or the 4×4 whitening matrix 722.

In one aspect, at 1102, the wireless device may generate at least one whitened channel by multiplying the at least one whitening matrix with at least one channel estimate for the first set of antennas. For example, the at least one whitened channel may be generated by multiplying the 4×4 whitening matrix 710 with the primary 4Rx channel estimate 706. In another example, the at least one whitened channel may be generated by multiplying the 4×4 whitening matrix 722 with the secondary 4Rx channel estimate 718. For example, 1102 may be performed by the CSF component 198 or the CSF component 199.

In one aspect, at 1104, the wireless device may generate an output by multiplying the at least one covariance matrix with the at least one whitened channel, where the wideband precoder may be selected based on the output. For example, FIG. 7 shows that a wireless device may generate Sout 714 by multiplying a covariance matrix calculated via the covariance matrix calculation 712 with at least one whitened channel generated by the 4×4 whitening matrix 710. For example, 1104 may be performed by the CSF component 198 or the CSF component 199.

In one aspect, the wireless device may be a UE, a base station, a network node, or a network entity. For example, the wireless device may be the UE 104, the UE 350, the UE 902, or the apparatus 1204. In another example, the wireless device may be the base station 102 or the base station 904. In yet another example, the wireless device may be the network entity 1302.

In one aspect, the maximum number of supported layers may correspond to a rank, where the number of the first set of antennas and the second set of antennas may be greater than or equal to the rank. For example, referring to FIG. 4, the number of the first set of antennas and the second set of antennas may be eight and the rank may be four.

In one aspect, the wideband precoder may be selected from a group of wideband precoders, where each wideband precoder in the group of wideband precoders may correspond to a different set of beams. For example, the wideband precoder 608, the wideband precoder 736, or the wideband precoder 804 may be selected from a group of wideband precoders where each wideband precoder in the group may correspond to a different set of beams.

In one aspect, the first set of performance metrics and the second set of performance metrics may be calculated based on at least one of: each subband in a set of subbands, each PMI in a set of PMIs, or each CW in a set of CWs. For example, FIG. 6 at 612 and 614 shows that the first SPEFs and the second SPEFs may be calculated on a per rank, per CW basis, respectively. In another example, FIG. 8 at 806 and 810 shows that the first SPEF and the second SPEFs may be calculated on a per CW, per PMI, and per subband basis.

In one aspect, the first set of performance metrics and the second set of performance metrics may be combined into a set of performance metrics, where the set of performance metrics includes a SNR. For example, FIG. 8 at 814 shows the first SNRs and the second SNRs calculated at 808 and 812, respectively, may be combined (i.e., summed).

In one aspect, the first set of performance metrics and the second set of performance metrics may be combined based on a LLR. For example, FIG. 4 depicts LLR addition 416.

In one aspect, at 1116, the wireless device may demap a first carrier associated with the first set of antennas to obtain a first set of LLRs. For example, FIG. 4 shows that a wireless device may perform a demap 412 on a first carrier associated with the primary 4Rx group 404 to obtain first LLRs that are added via the LLR addition 416. For example, 1116 may be performed by the CSF component 198 or the CSF component 199.

In one aspect, at 1118, the wireless device may demap a second carrier associated with the second set of antennas to obtain a second set of LLRs. For example, FIG. 4 shows that a wireless device may perform a demap 414 on a second carrier associated with the secondary 4Rx group 406 to obtain second LLRs that are added via the LLR addition 416. For example, 1118 may be performed by the CSF component 198 or the CSF component 199.

In one aspect, at 1120, the wireless device may calculate a sum of the first set of LLRs and the second set of LLRs. For example, FIG. 4 illustrates that a wireless device may perform LLR addition 416 on first LLRs generated by the demap 412 and second LLRs generated by the demap 414. For example, 1120 may be performed by the CSF component 198 or the CSF component 199.

In one aspect, at 1122, the wireless device may perform LDPC decoding based on the sum of the first set of LLRs and the second set of LLRs. For example, FIG. 4 shows that a wireless device may perform a LDPC decode 418 on LLRs summed during the LLR addition 416. For example, 1122 may be performed by the CSF component 198 or the CSF component 199.

In one aspect, at 1124, the wireless device may multiply a channel dimensionality reduction matrix with a signal associated with a size equal to the number of the first set of antennas and the second set of antennas to obtain a carrier having dimensions equal to a maximum supported rank. For example, FIG. 5 illustrates a channel dimensionality reduction operation 504 in which a 4×8 beamforming/channel dimensionality reduction matrix 506 may be multiplied by a received 8×1 signal 502. For example, 1124 may be performed by the CSF component 198 or the CSF component 199.

In one aspect, at 1126, the wireless device may demap the carrier to obtain a set of LLRs. For example, FIG. 5 illustrates that a wireless device may perform a demap 508 on an output of the channel dimensionality reduction operation 504 to obtain LLRs. For example, 1126 may be performed by the CSF component 198 or the CSF component 199.

In one aspect, at 1128, the wireless device may perform LDPC decoding on the set of LLRs. For example, FIG. 5 illustrates that a wireless device may perform a LDPC decode 510 on LLRs generated by the demap 508. For example, 1128 may be performed by the CSF component 198 or the CSF component 199.

In one aspect, at 1112, the wireless device may convert, based on the combination of the first set of performance metrics for the first set of antennas and the second set of performance metrics for the second set of antennas, the first set of performance metrics and the second set of performance metrics to a spectral efficiency for the first set of antennas and the second set of antennas. For example, FIG. 9 at 912 shows that the UE 902 or the base station 904 may convert a first set of performance metrics and a second set of performance metrics to SPEF. In another aspect, FIG. 8 at 816 shows that a wireless device may convert first SNRs and second SNRs to a SPEF. For example, 1112 may be performed by the CSF component 198 or the CSF component 199.

In one aspect, at 1112A, converting the first set of performance metrics and the second set of performance metrics to the spectral efficiency for the first set of antennas and the second set of antennas may include: calculating a first spectral efficiency for the first set of antennas and a second spectral efficiency for the second set of antennas based on the selected wideband precoder. For example, FIG. 8 at 806 and 810 shows that a wireless device may calculate a first SPEF and a second SPEF, respectively, based on the wideband precoder 804. For example, 1112A may be performed by the CSF component 198 or the CSF component 199.

In one aspect, at 1112B, converting the first set of performance metrics and the second set of performance metrics to the spectral efficiency for the first set of antennas and the second set of antennas may include: calculating a first SNR for the first set of antennas and a second SNR for the second set of antennas based on the first spectral efficiency and the second spectral efficiency, respectively, and the maximum number of supported layers. For example, FIG. 8 at 808 and 812 shows that a wireless device may calculate first SNRs based on the first SPEFs calculated at 808 and a maximum number of supported layers and second SNRs based on the second SPEFs calculated at 810 and the maximum number of supported layers, respectively. For example, 1112B may be performed by the CSF component 198 or the CSF component 199.

In one aspect, at 1112C, converting the first set of performance metrics and the second set of performance metrics to the spectral efficiency for the first set of antennas and the second set of antennas may include: calculating a sum of the first SNR and the second SNR. For example, FIG. 8 at 814 shows that a wireless device may sum the first SNRs calculated at 808 and the second SNRs calculated at 812. For example, 1112C may be performed by the CSF component 198 or the CSF component 199.

In one aspect, at 1112D, converting the first set of performance metrics and the second set of performance metrics to the spectral efficiency for the first set of antennas and the second set of antennas may include: converting the sum of the first SNR and the second SNR to the spectral efficiency for the first set of antennas and the second set of antennas based on the maximum number of supported layers. For example, FIG. 8 at 816 shows that a wireless device may obtain a SPEF by multiplying the (summed) SNR by a number of supported layers. For example, 1112D may be performed by the CSF component 198 or the CSF component 199.

In one aspect, at 1114, the wireless device may receive data via the first set of antennas and the second set of antennas based on the combination of the first set of performance metrics and the second set of performance metrics. For example, FIG. 9 at 914 shows that the UE 902 may receive data based on the combination of the first set of performance metrics and the second set of performance metrics. In another example, FIG. 9 at 916 shows that the base station 904 may receive data based on the combination of the first set of performance metrics and the second set of performance metrics. For example, 1114 may be performed by the CSF component 198 or the CSF component 199.

Figure 12:
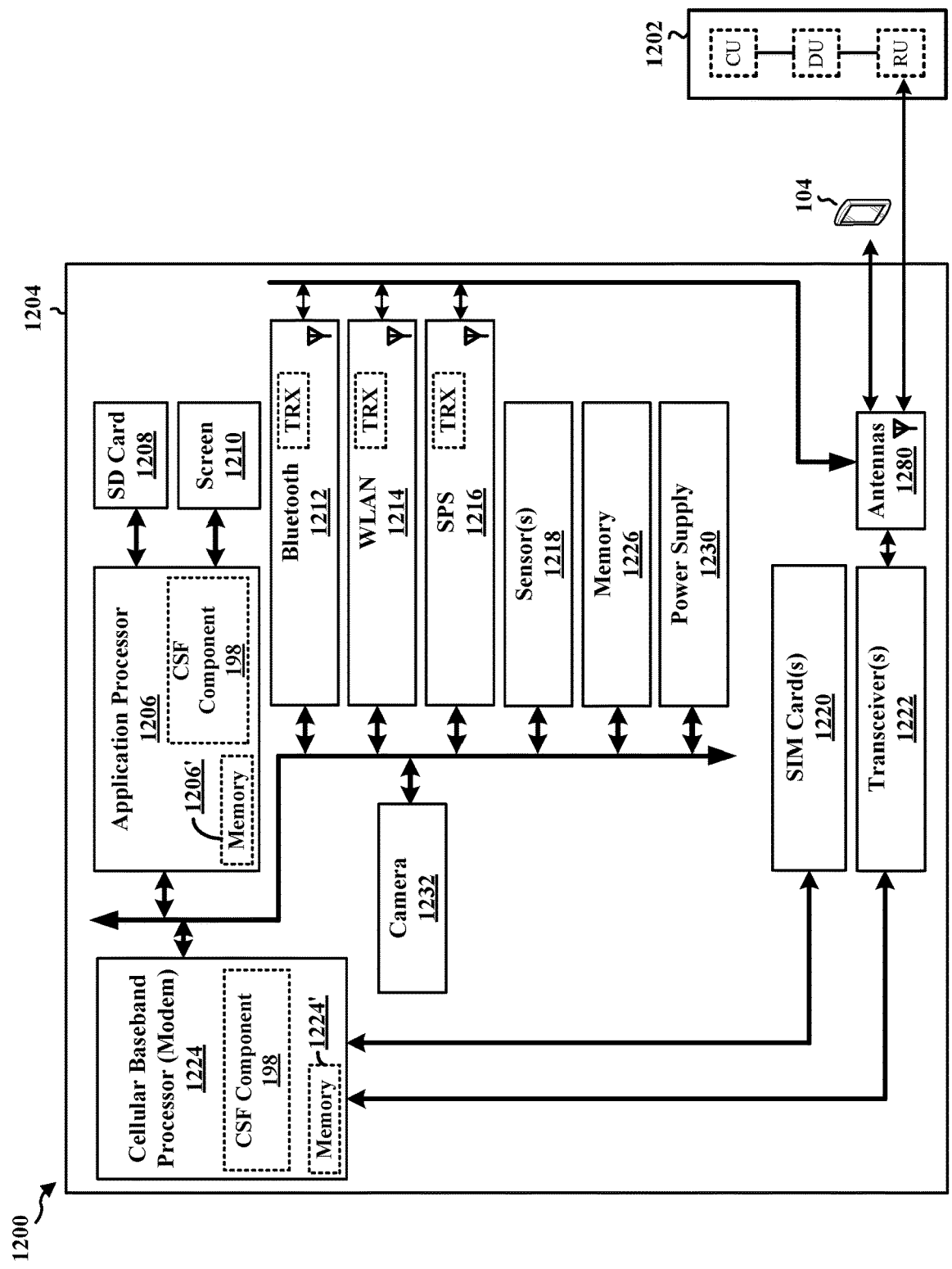
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed supra, the CSF component 198 is configured to select a wideband precoder for a first set of antennas and a second set of antennas based on at least one matrix, where a number of the first set of antennas and the second set of antennas is greater than a maximum number of supported layers. The CSF component 198 is also configured to calculate, based on the selected wideband precoder, a first set of performance metrics for the first set of antennas and a second set of performance metrics for the second set of antennas. The CSF component 198 is also configured to combine the first set of performance metrics for the first set of antennas and the second set of performance metrics for the second set of antennas based on the calculation. The CSF component 198 may be within the cellular baseband processor 1224, the application processor 1206, or both the cellular baseband processor 1224 and the application processor 1206. The CSF component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for selecting a wideband precoder for a first set of antennas and a second set of antennas based on at least one matrix, where a number of the first set of antennas and the second set of antennas is greater than a maximum number of supported layers. In one configuration, the apparatus 1204, and in particular the cellular baseband processor 1224 and/or the application processor 1206, includes means for calculating, based on the selected wideband precoder, a first set of performance metrics for the first set of antennas and a second set of performance metrics for the second set of antennas. In one configuration, the apparatus 1204, and in particular the cellular baseband processor 1224 and/or the application processor 1206, includes means for combining the first set of performance metrics for the first set of antennas and the second set of performance metrics for the second set of antennas based on the calculation. In one configuration, the apparatus 1204, and in particular the cellular baseband processor 1224 and/or the application processor 1206, includes means for generating at least one whitened channel by multiplying the at least one whitening matrix with at least one channel estimate for the first set of antennas. In one configuration, the apparatus 1204, and in particular the cellular baseband processor 1224 and/or the application processor 1206, includes means for generating an output by multiplying the at least one covariance matrix with the at least one whitened channel, where the wideband precoder is selected based on the output. In one configuration, the apparatus 1204, and in particular the cellular baseband processor 1224 and/or the application processor 1206, includes means for demapping a first carrier associated with the first set of antennas to obtain a first set of LLRs. In one configuration, the apparatus 1204, and in particular the cellular baseband processor 1224 and/or the application processor 1206, includes means for demapping a second carrier associated with the second set of antennas to obtain a second set of LLRs. In one configuration, the apparatus 1204, and in particular the cellular baseband processor 1224 and/or the application processor 1206, includes means for calculating a sum of the first set of LLRs and the second set of LLRs. In one configuration, the apparatus 1204, and in particular the cellular baseband processor 1224 and/or the application processor 1206, includes means for performing LDPC decoding based on the sum of the first set of LLRs and the second set of LLRs. In one configuration, the apparatus 1204, and in particular the cellular baseband processor 1224 and/or the application processor 1206, includes means for multiplying a channel dimensionality reduction matrix with a signal associated with a size equal to the number of the first set of antennas and the second set of antennas to obtain a carrier having dimensions equal to a maximum supported rank. In one configuration, the apparatus 1204, and in particular the cellular baseband processor 1224 and/or the application processor 1206, includes means for demapping the carrier to obtain a set of LLRs. In one configuration, the apparatus 1204, and in particular the cellular baseband processor 1224 and/or the application processor 1206, includes means for performing LDPC decoding on the set of LLRs. In one configuration, the apparatus 1204, and in particular the cellular baseband processor 1224 and/or the application processor 1206, includes means for converting, based on the combination of the first set of performance metrics for the first set of antennas and the second set of performance metrics for the second set of antennas, the first set of performance metrics and the second set of performance metrics to a spectral efficiency for the first set of antennas and the second set of antennas. In one configuration, the apparatus 1204, and in particular the cellular baseband processor 1224 and/or the application processor 1206, includes means for calculating a first spectral efficiency for the first set of antennas and a second spectral efficiency for the second set of antennas based on the selected wideband precoder. In one configuration, the apparatus 1204, and in particular the cellular baseband processor 1224 and/or the application processor 1206, includes means for calculating a first SNR for the first set of antennas and a second SNR for the second set of antennas based on the first spectral efficiency and the second spectral efficiency, respectively, and the maximum number of supported layers. In one configuration, the apparatus 1204, and in particular the cellular baseband processor 1224 and/or the application processor 1206, includes means for calculating a sum of the first SNR and the second SNR. In one configuration, the apparatus 1204, and in particular the cellular baseband processor 1224 and/or the application processor 1206, includes means for converting the sum of the first SNR and the second SNR to the spectral efficiency for the first set of antennas and the second set of antennas based on the maximum number of supported layers. In one configuration, the apparatus 1204, and in particular the cellular baseband processor 1224 and/or the application processor 1206, includes means for receiving data via the first set of antennas and the second set of antennas based on the combination of the first set of performance metrics and the second set of performance metrics. The means may be the CSF component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
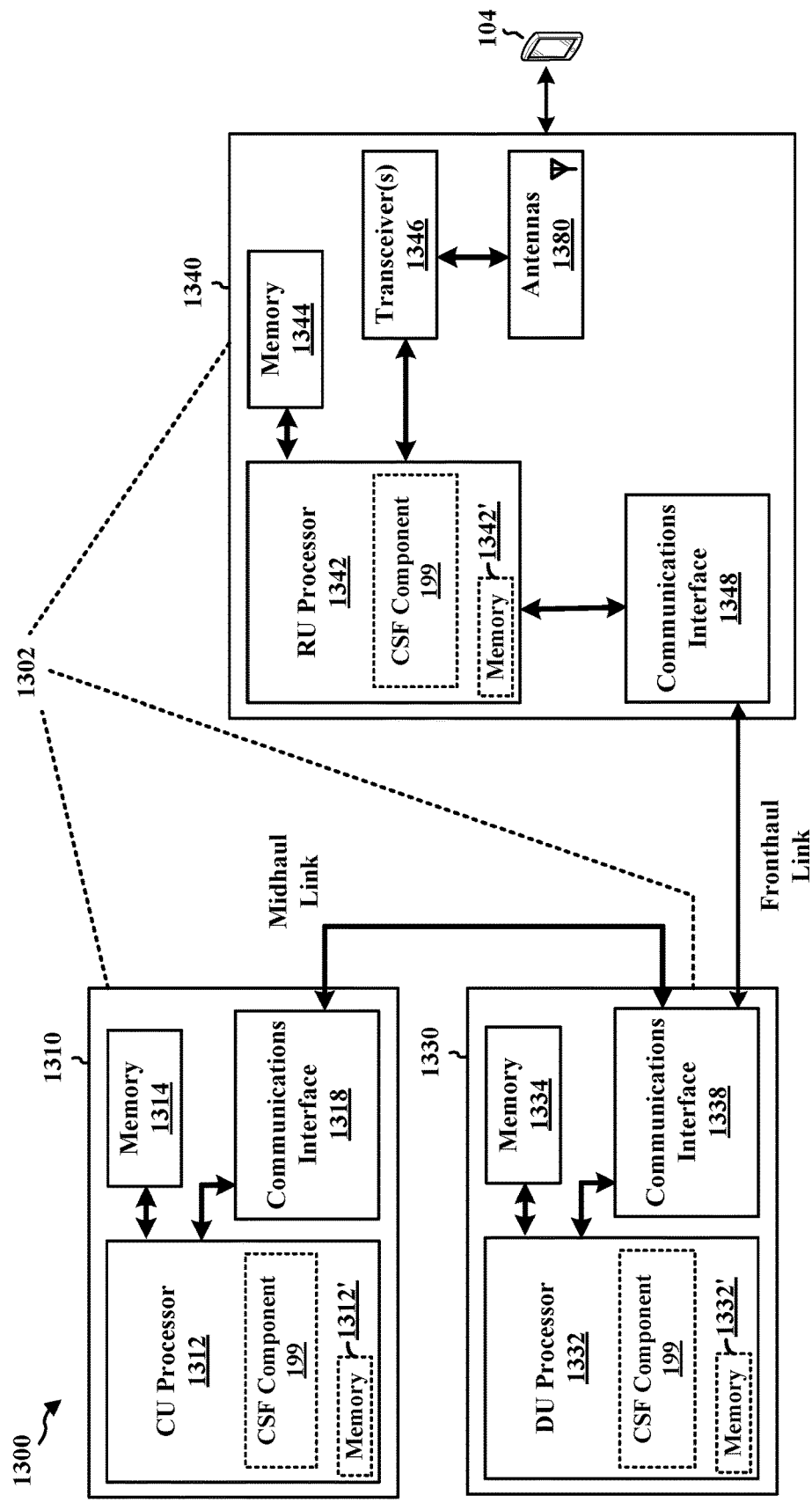
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the CSF component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the CSF component 199 is configured to select a wideband precoder for a first set of antennas and a second set of antennas based on at least one matrix, where a number of the first set of antennas and the second set of antennas is greater than a maximum number of supported layers. The CSF component is also configured to calculate, based on the selected wideband precoder, a first set of performance metrics for the first set of antennas and a second set of performance metrics for the second set of antennas. The CSF component 199 is also configured to combine the first set of performance metrics for the first set of antennas and the second set of performance metrics for the second set of antennas based on the calculation. The CSF component 199 may be within one or more processors of one or more of the CU 1310, DU 1330, and the RU 1340. The CSF component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 includes means for selecting a wideband precoder for a first set of antennas and a second set of antennas based on at least one matrix, where a number of the first set of antennas and the second set of antennas is greater than a maximum number of supported layers. In one configuration, the network entity 1302 includes means for calculating, based on the selected wideband precoder, a first set of performance metrics for the first set of antennas and a second set of performance metrics for the second set of antennas. In one configuration, the network entity 1302 includes means for combining the first set of performance metrics for the first set of antennas and the second set of performance metrics for the second set of antennas based on the calculation. In one configuration, the network entity 1302 includes means for generating at least one whitened channel by multiplying the at least one whitening matrix with at least one channel estimate for the first set of antennas. In one configuration, the network entity 1302 includes means for generating an output by multiplying the at least one covariance matrix with the at least one whitened channel, where the wideband precoder is selected based on the output. In one configuration, the network entity 1302 includes means for demapping a first carrier associated with the first set of antennas to obtain a first set of LLRs. In one configuration, the network entity 1302 includes means for demapping a second carrier associated with the second set of antennas to obtain a second set of LLRs. In one configuration, the network entity 1302 includes means for performing LDPC decoding based on the sum of the first set of LLRs and the second set of LLRs. In one configuration, the network entity 1302 includes means for calculating a sum of the first set of LLRs and the second set of LLRs. In one configuration, the network entity 1302 includes means for multiplying a channel dimensionality reduction matrix with a signal associated with a size equal to the number of the first set of antennas and the second set of antennas to obtain a carrier having dimensions equal to a maximum supported rank. In one configuration, the network entity 1302 includes means for demapping the carrier to obtain a set of LLRs. In one configuration, the network entity 1302 includes means for performing LDPC decoding on the set of LLRs. In one configuration, the network entity 1302 includes means for converting, based on the combination of the first set of performance metrics for the first set of antennas and the second set of performance metrics for the second set of antennas, the first set of performance metrics and the second set of performance metrics to a spectral efficiency for the first set of antennas and the second set of antennas. In one configuration, the network entity 1302 includes means for calculating a first spectral efficiency for the first set of antennas and a second spectral efficiency for the second set of antennas based on the selected wideband precoder. In one configuration, the network entity 1302 includes means for calculating a first SNR for the first set of antennas and a second SNR for the second set of antennas based on the first spectral efficiency and the second spectral efficiency, respectively, and the maximum number of supported layers. In one configuration, the network entity 1302 includes means for calculating a sum of the first SNR and the second SNR. In one configuration, the network entity 1302 includes means for converting the sum of the first SNR and the second SNR to the spectral efficiency for the first set of antennas and the second set of antennas based on the maximum number of supported layers. In one configuration, the network entity 1302 includes means for receiving data via the first set of antennas and the second set of antennas based on the combination of the first set of performance metrics and the second set of performance metrics. The means may be the CSF component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

A modem used in a wireless communication system may be configured with one or more Rx antennas. The modem may receive a signal via the Rx antenna(s) and demodulate the signal to obtain digital information. Some modems may be configured with a first number of Rx antennas while including baseband resources for a second number of Rx antennas, where the first number is greater than the second number. In an example, a modem may include eight Rx antennas while including baseband resources for four Rx antennas. The modem may have a maximum supported rank equal to the second number of Rx antennas. Thus, additional antennas in excess of the second number of Rx antennas may provide receive diversity for the modem, that is, the additional antennas may receive the same information to mitigate fading. The additional antennas may not increase a number of layers that may be decoded by the modem. The modem may handle a complexity increase associated with the additional antennas by halving bandwidth supported across component carriers supported in baseline.

Various techniques described herein relate to utilizing hardware resources of a modem to perform demodulation and channel state feedback (CSF), where the modem may be configured with a first number of Rx antennas (e.g., eight) and the hardware resources may support a second number of Rx antennas (e.g., four), where the first number is greater than the second number. In an example, a wireless device selects a wideband precoder for a first set of antennas and a second set of antennas based on at least one matrix, where a number of the first set of antennas and the second set of antennas is greater than a maximum number of supported layers. The wireless device calculates, based on the selected wideband precoder, a first set of performance metrics for the first set of antennas and a second set of performance metrics for the second set of antennas. The wireless device combines the first set of performance metrics for the first set of antennas and the second set of performance metrics for the second set of antennas based on the calculation. Vis-à-vis the aforementioned combining, the wireless device may perform 8Rx demodulation and CSF when the wireless device includes baseband resources that support 4Rx demodulation, but not 8Rx demodulation. Thus, the combining may extend functionality of existing hardware resources of the wireless device.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device, including selecting a wideband precoder for a first set of antennas and a second set of antennas based on at least one matrix, where a number of the first set of antennas and the second set of antennas is greater than a maximum number of supported layers; calculating, based on the selected wideband precoder, a first set of performance metrics for the first set of antennas and a second set of performance metrics for the second set of antennas; and combining the first set of performance metrics for the first set of antennas and the second set of performance metrics for the second set of antennas based on the calculation.

Aspect 2 is the method of aspect 1, where the at least one matrix is calculated based on an average of all of the first set of antennas and the second set of antennas.

Aspect 3 is the method of any of aspects 1-2, where the first set of antennas includes a set of first reception (Rx) antennas and the second set of antennas includes a set of second Rx antennas.

Aspect 4 is the method of any of aspects 1-3, where the at least one matrix includes at least one covariance matrix.

Aspect 5 is the method of aspect 4, where the at least one matrix further includes at least one whitening matrix.

Aspect 6 is the method of aspect 5, further including: generating at least one whitened channel by multiplying the at least one whitening matrix with at least one channel estimate for the first set of antennas; and generating an output by multiplying the at least one covariance matrix with the at least one whitened channel, where the wideband precoder is selected based on the output.

Aspect 7 is the method of any of aspects 1-6, where the wireless device is a user equipment (UE), a base station, a network node, or a network entity.

Aspect 8 is the method of any of aspects 1-7, where the maximum number of supported layers corresponds to a rank, where the number of the first set of antennas and the second set of antennas is greater than or equal to the rank.

Aspect 9 is the method of any of aspects 1-8, where the wideband precoder is selected from a group of wideband precoders, where each wideband precoder in the group of wideband precoders corresponds to a different set of beams.

Aspect 10 is the method of any of aspects 1-9, where the first set of performance metrics and the second set of performance metrics are calculated based on at least one of: each subband in a set of subbands, each precoding matrix indicator (PMI) in a set of PMIs, or each codeword (CW) in a set of CWs.

Aspect 11 is the method of any of aspects 1-10, where the first set of performance metrics and the second set of performance metrics are combined into a set of performance metrics, where the set of performance metrics includes a signal-to-noise ratio (SNR).

Aspect 12 is the method of any of aspects 1-11, where the first set of performance metrics and the second set of performance metrics are combined based on a log likelihood ratio (LLR).

Aspect 13 is the method of any of aspects 1-12, further including: demapping a first carrier associated with the first set of antennas to obtain a first set of log likelihood ratios (LLRs); demapping a second carrier associated with the second set of antennas to obtain a second set of LLRs; calculating a sum of the first set of LLRs and the second set of LLRs; and performing low density parity-check (LDPC) decoding based on the sum of the first set of LLRs and the second set of LLRs.

Aspect 14 is the method of any of aspects 1-12, further including: multiplying a channel dimensionality reduction matrix with a signal associated with a size equal to the number of the first set of antennas and the second set of antennas to obtain a carrier having dimensions equal to a maximum supported rank; demapping the carrier to obtain a set of log likelihood ratios (LLRs); and performing low density parity-check (LDPC) decoding on the set of LLRs.

Aspect 15 is the method of any of aspects 1-14, further including: converting, based on the combination of the first set of performance metrics for the first set of antennas and the second set of performance metrics for the second set of antennas, the first set of performance metrics and the second set of performance metrics to a spectral efficiency for the first set of antennas and the second set of antennas.

Aspect 16 is the method of aspect 15, where converting the first set of performance metrics and the second set of performance metrics to the spectral efficiency for the first set of antennas and the second set of antennas includes: calculating a first spectral efficiency for the first set of antennas and a second spectral efficiency for the second set of antennas based on the selected wideband precoder; calculating a first signal-to-noise ratio (SNR) for the first set of antennas and a second SNR for the second set of antennas based on the first spectral efficiency and the second spectral efficiency, respectively, and the maximum number of supported layers; calculating a sum of the first SNR and the second SNR; and converting the sum of the first SNR and the second SNR to the spectral efficiency for the first set of antennas and the second set of antennas based on the maximum number of supported layers.

Aspect 17 is the method of any of aspects 1-16, further including: receiving data via the first set of antennas and the second set of antennas based on the combination of the first set of performance metrics and the second set of performance metrics.

Aspect 18 is an apparatus for wireless communication at a wireless device including a memory and at least one processor coupled to the memory and based at least in part on information stored in the memory, the at least one processor is configured to perform a method in accordance with any of aspects 1-17.

Aspect 19 is an apparatus for wireless communications, including means for performing a method in accordance with any of aspects 1-17.

Aspect 20 is the apparatus of aspect 18 or 19, further including at least one of a transceiver or an antenna coupled to the at least one processor, where the at least one processor is configured to receive the data via at least one of the transceiver or the antenna.

Aspect 21 is a non-transitory computer-readable medium including instructions that, when executed by an apparatus, cause the apparatus to perform a method in accordance with any of aspects 1-17.

What is claimed is:

1. An apparatus for wireless communication at a wireless device, comprising:
 a memory; and
 at least one processor coupled to the memory and, based at least in part on information stored in the memory, the at least one processor is configured to:
  select a wideband precoder for a first set of antennas and a second set of antennas based on at least one matrix, wherein a number of the first set of antennas and the second set of antennas is greater than a maximum number of supported layers;

calculate, based on the selected wideband precoder, a first set of performance metrics for the first set of antennas and a second set of performance metrics for the second set of antennas; and combine the first set of performance metrics for the first set of antennas and the second set of performance metrics for the second set of antennas based on the calculation.

2. The apparatus of claim 1, wherein the at least one matrix is calculated based on an average of all of the first set of antennas and the second set of antennas.

3. The apparatus of claim 1, wherein the first set of antennas includes a set of first reception (Rx) antennas and the second set of antennas includes a set of second Rx antennas.

4. The apparatus of claim 1, wherein the at least one matrix includes at least one covariance matrix.

5. The apparatus of claim 4, wherein the at least one matrix further comprises at least one whitening matrix.

6. The apparatus of claim 5, wherein the at least one processor is further configured to:

generate at least one whitened channel by multiplying the at least one whitening matrix with at least one channel estimate for the first set of antennas; and generate an output by multiplying the at least one covariance matrix with the at least one whitened channel, wherein the wideband precoder is selected based on the output.

7. The apparatus of claim 1, wherein the wireless device is a user equipment (UE), a base station, a network node, or a network entity.

8. The apparatus of claim 1, wherein the maximum number of supported layers corresponds to a rank, wherein the number of the first set of antennas and the second set of antennas is greater than or equal to the rank.

9. The apparatus of claim 1, wherein the wideband precoder is selected from a group of wideband precoders, wherein each wideband precoder in the group of wideband precoders corresponds to a different set of beams.

10. The apparatus of claim 1, wherein the first set of performance metrics and the second set of performance metrics are calculated based on at least one of:

each subband in a set of subbands, each precoding matrix indicator (PMI) in a set of PMIs, or each codeword (CW) in a set of CWs.

11. The apparatus of claim 1, wherein the first set of performance metrics and the second set of performance metrics are combined into a combined set of performance metrics, wherein the combined set of performance metrics includes a signal-to-noise ratio (SNR).

12. The apparatus of claim 1, wherein the first set of performance metrics and the second set of performance metrics are combined based on a log likelihood ratio (LLR).

13. The apparatus of claim 1, wherein the at least one processor is further configured to:

demap a first carrier associated with the first set of antennas to obtain a first set of log likelihood ratios (LLRs);

demap a second carrier associated with the second set of antennas to obtain a second set of LLRs;

calculate a sum of the first set of LLRs and the second set of LLRs; and perform low density parity-check (LDPC) decoding based on the sum of the first set of LLRs and the second set of LLRs.

14. The apparatus of claim 1, wherein the at least one processor is further configured to:

multiply a channel dimensionality reduction matrix with a signal associated with a size equal to the number of the first set of antennas and the second set of antennas to obtain a carrier having dimensions equal to a maximum supported rank;

demap the carrier to obtain a set of log likelihood ratios (LLRs); and perform low density parity-check (LDPC) decoding on the set of LLRs.

15. The apparatus of claim 1, wherein the at least one processor is further configured to:

convert, based on the combination of the first set of performance metrics for the first set of antennas and the second set of performance metrics for the second set of antennas, the first set of performance metrics and the second set of performance metrics to a spectral efficiency for the first set of antennas and the second set of antennas.

16. The apparatus of claim 15, wherein convert the first set of performance metrics and the second set of performance metrics to the spectral efficiency for the first set of antennas and the second set of antennas is further configured to:

calculate a first spectral efficiency for the first set of antennas and a second spectral efficiency for the second set of antennas based on the selected wideband precoder;

calculate a first signal-to-noise ratio (SNR) for the first set of antennas and a second SNR for the second set of antennas based on the first spectral efficiency and the second spectral efficiency, respectively, and the maximum number of supported layers;

calculate a sum of the first SNR and the second SNR; and convert the sum of the first SNR and the second SNR to the spectral efficiency for the first set of antennas and the second set of antennas based on the maximum number of supported layers.

17. The apparatus of claim 1, further comprising at least one of a transceiver or an antenna coupled to the at least one processor, wherein the at least one processor is further configured to:

receive data via the first set of antennas and the second set of antennas based on the combination of the first set of performance metrics and the second set of performance metrics, wherein the at least one processor is configured to receive the data via at least one of the transceiver or the antenna.

18. A method of wireless communication at a wireless device, comprising:

selecting a wideband precoder for a first set of antennas and a second set of antennas based on at least one matrix, wherein a number of the first set of antennas and the second set of antennas is greater than a maximum number of supported layers;

calculating, based on the selected wideband precoder, a first set of performance metrics for the first set of antennas and a second set of performance metrics for the second set of antennas; and combining the first set of performance metrics for the first set of antennas and the second set of performance metrics for the second set of antennas based on the calculation.

19. The method of claim 18, wherein the at least one matrix is calculated based on an average of all of the first set of antennas and the second set of antennas.

20. The method of claim 18, wherein the first set of antennas includes a set of first reception (Rx) antennas and the second set of antennas includes a set of second Rx antennas.

21. The method of claim 18, wherein the at least one matrix includes at least one covariance matrix.

22. The method of claim 21, wherein the at least one matrix further comprises at least one whitening matrix.

23. The method of claim 22, further comprising:
generating at least one whitened channel by multiplying the at least one whitening matrix with at least one channel estimate for the first set of antennas; and
generating an output by multiplying the at least one covariance matrix with the at least one whitened channel, wherein the wideband precoder is selected based on the output.

24. The method of claim 18, wherein the wireless device is a user equipment (UE), a base station, a network node, or a network entity.

25. The method of claim 18, wherein the maximum number of supported layers corresponds to a rank, wherein the number of the first set of antennas and the second set of antennas is greater than or equal to the rank.

26. The method of claim 18, wherein the wideband precoder is selected from a group of wideband precoders, wherein each wideband precoder in the group of wideband precoders corresponds to a different set of beams.

27. The method of claim 18, wherein the first set of performance metrics and the second set of performance metrics are calculated based on at least one of:
each subband in a set of subbands,
each precoding matrix indicator (PMI) in a set of PMIs, or
each codeword (CW) in a set of CWs.

28. The method of claim 18, wherein the first set of performance metrics and the second set of performance metrics are combined into a set of performance metrics, wherein the set of performance metrics includes a signal-to-noise ratio (SNR).

29. An apparatus for wireless communication at a wireless device, comprising:
means for selecting a wideband precoder for a first set of antennas and a second set of antennas based on at least one matrix, wherein a number of the first set of antennas and the second set of antennas is greater than a maximum number of supported layers;
means for calculating, based on the selected wideband precoder, a first set of performance metrics for the first set of antennas and a second set of performance metrics for the second set of antennas; and
means for combining the first set of performance metrics for the first set of antennas and the second set of performance metrics for the second set of antennas based on the calculation.

* * * * *